US006281278B1

(12) United States Patent
Takase et al.

(10) Patent No.: US 6,281,278 B1
(45) Date of Patent: Aug. 28, 2001

(54) MODIFIED THERMOPLASTIC RESIN COMPOSITION AND METHOD OF PRODUCING THE SAME

(75) Inventors: Toru Takase; Tatsuji Maekawa; Hideshi Kurihara, all of Matsuyama; Takuo Nakao, Tokyo, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/331,883

(22) PCT Filed: Nov. 9, 1998

(86) PCT No.: PCT/JP98/05035

§ 371 Date: Jun. 29, 1999

§ 102(e) Date: Jun. 29, 1999

(87) PCT Pub. No.: WO99/24495

PCT Pub. Date: May 20, 1999

(30) Foreign Application Priority Data

Nov. 10, 1997 (JP) .................................................. 9-307362

(51) Int. Cl.⁷ ...................................................... C08K 3/22
(52) U.S. Cl. .......................... 524/497; 523/200; 524/500; 524/513; 524/522; 524/523
(58) Field of Search .................................... 524/497, 500, 524/513, 522, 523; 523/200

(56) References Cited

U.S. PATENT DOCUMENTS 4,877,819 * 10/1989 Kiyohara et al. ..................... 523/200
4,898,897 * 2/1990 Kiyohara et al. ..................... 523/343
5,256,732 * 10/1993 Morita et al. ........................... 525/52
5,281,379 * 1/1994 Noguchi et al. ...................... 264/102

FOREIGN PATENT DOCUMENTS

| 60-71205 | 4/1985 | (JP) | ................. B29B/7/02 |
| 63-268734 | 11/1988 | (JP) | ................. C08G/63/22 |
| 8-198974 | 8/1996 | (JP) | ................. C08J/3/22 |
| 8-295741 | 11/1996 | (JP) | ................. C08J/3/22 |
| 9-57742 | 3/1997 | (JP) | ................. B29B/7/30 |

* cited by examiner

Primary Examiner—Edward J. Cain
(74) Attorney, Agent, or Firm—Sughrue, Mion, Zinn, Macpeak & Seas, PLLC

(57) ABSTRACT

A process for preparing a modified thermoplastic resin composition by incorporating a modifier-containing thermoplastic resin into a transport line of a thermoplastic resin, comprising subjecting the resin to static mixing and to dynamic mixing by passing the resin through a dynamic mixing apparatus having a mixing blade unit and a power unit for driving the mixing blade unit and provided in the same transport line, as well as a modified thermoplastic resin composition prepared by the process and having a filtration pressure increase rate of no greater than 10 kg/cm²/hr when filtration is performed using a double layer of 2400 mesh wire filters with an inner diameter of 64 mmφ, at a melting point of the modified thermoplastic resin or a temperature of from 20° C. to 100° C. higher than the plasticizing point of the resin and at a filtration rate of 33.3 g/min.

25 Claims, 8 Drawing Sheets

MODIFIED THERMOPLASTIC RESIN COMPOSITION AND METHOD OF PRODUCING THE SAME

TECHNICAL FIELD

The present invention relates to a modified thermoplastic resin composition and a process for preparing it. More specifically, the present invention relates to a process for continuous preparation of a modifier-containing thermoplastic resin wherein a modifier useful for fibers, films and other molded products is added and/or copolymerized therewith to give high uniformity and good dispersing properties, and to a thermoplastic resin composition obtained by the process.

BACKGROUND ART

Polyesters, polyamides, polyolefins and other representative thermoplastic resins (Throughout this specification, the simple term "resin" will sometimes be used to refer to such "thermoplastic resins".) have excellent physical and chemical properties and are therefore widely used as fibers, films and other molded products. Despite their superior properties, however, such resins are associated with such undesirable problems as poor workability during molding, or poor manageability as a result of unsatisfactory sliding properties of the molded products themselves during their handling.

Several techniques have already been developed in order to solve these problems. For example, numerous methods have been proposed for improving the surface slidability of molded products by including fine particles in the resins to provide suitable irregularities on the surfaces of the molded properties, and a few of these methods are being employed. Taking polyesters as an example, there is a process whereby silicon oxide, titanium dioxide, calcium carbonate, talc, kaolinite or other inactive inorganic particles are added to the polyesters (see, for example, Japanese Unexamined Patent Publication No. 55-133431), and a process whereby heat-resistant polymer particles such as silicon particles or polystyrene particles are added to the polyesters (see, for example, Japanese Unexamined Patent Publication No. 3-115354).

The aforementioned thermoplastic resins are also used, in a wide range of industrial fields, as modified resins endowed with new properties such as flame retardance, electrostatic properties, dyeability, dyeing clarity and heat resistance which cannot be obtained by resins alone, while still maintaining the original excellent properties of the resins. Techniques for producing resins which meet the demands for such a wide range of uses include, in addition to the inclusion of particles as mentioned above, also methods of copolymerization or blending of the resins with different functional substances for different purposes, and such methods provide good results in terms of high performance and high functionability of the final products.

One process which has been attempted as a technique for giving various functions to thermoplastic resins involves providing a mixing apparatus in the polymer transport line of the molding step for reeling or film formation, to uniformly add and mix different additives with the resins. However in most cases, since the thermoplastic resins are highly viscous when in a molten state, addition and mixture of particulate, liquid or pasty additives directly with the resins results in poor dispersability of the additives in the resins and insufficient quality when used as fibers or films.

Thus, in order to improve the dispersability of additives, inclusion of such additives to resins has been accomplished by a method wherein a "master batch" containing a given additive at high concentration is prepared first and kneaded into the molten resin to improve the dispersability of the additive in the resin. According to this method, preparation of the master batch allows the viscosity and surface tension of the master batch to be adjusted to match that of the resin with which it will be kneaded, for kneading of the master batch with the resin, and thus allows the state of admixture to be improved. In the kneading systems for such master batch processes, static mixing apparatuses used as part of the transport line up to molding of the resin are a publicly known type of mixing apparatus. An example of a known process where such a static mixing apparatus is employed is one in which two types of chips, for the resin and the master batch, are blended prior to the kneading extruder for melting of the chipped resin, and after loading and melting, they are passed through a static mixing apparatus and sent to a reeling machine (see Japanese Unexamined Patent Publication No. 59-126457). According to this process, however, mixture of the resin is accomplished not dynamically but statically, and therefore since there is no external energy during mixing there has been a limit to the extent of admixture of the additives. As a result, the density and quality of obtained products have been non-uniform, the dispersion of additives in resins has been inadequate, and their uses have been limited to a narrow range including those which do not demand high performance products.

Incidentally, systems for polymerization of thermoplastic resins are gradually shifting from the conventional batch systems to continuous polymerization systems. This is because continuous polymerization systems give products with less quality variation than batch polymerization systems, are suitable for mass production of specific grades over long periods, and are overwhelmingly advantageous in terms of cost. In addition, products discharged from batch polymerization systems have lower intrinsic viscosity with time, more quality variation between different batches resulting in poor color, and more variation in stocked materials and quality variation between batches due to differences in reaction conditions, etc. In order to solve these problems, such as the problem that once the resin has been chipped it must be blended with chips obtained from a different batch, continuous polymerization systems achieve low quality variation by keeping constant and consistent control of the operating conditions in each step. Also, when disturbances or other variations occur, it is relatively easy with continuous polymerization systems to minimize changes in resulting products with time during the polymerization step by appropriately controlling the process conditions so as to eliminate such disturbances. In addition, while it is difficult to increase the performance of existing equipment for each batch in a batch system, in the case of continuous polymerization systems the advantages have been multiplied by recent progress in technological innovations which allow scaled-up production.

Despite the advantages described above, continuous polymerization systems have a disadvantage in that they are not adaptable for small-scale production of different product types. In particular, for production of modified thermoplastic resins containing various modifiers such as those mentioned above, changing the type of modifier requires cleaning of the entire massive continuous polymerization apparatus, resulting in a huge loss which includes that of polymer waste, cleaning chemicals and time. With the rapid progress in scaled-up size and product diversity in recent years, these disadvantages of continuous polymerization systems have become ever more serious.

In light of this background, the greatest technical issue in the field of producing resin compositions has recently become that of determining how to achieve production with increased dispersion of modifiers in different modified thermoplastic resin compositions without losing the cost merit of continuous polymerization, and how to diversify for different final needs.

In addition, with the development of continuous polymerization systems it has recently become practical to accomplish direct film formation and spinning for formation of films and spinning of fibers. With developing techniques, continuous polymerization-based direct film formation and direct spinning systems are being employed in the attempt to eliminate steps which are essential in batch systems, such as transport of the fully polymerized polymer to the film formation or spinning step after first being chipped, stored in a silo and dried, and with the purpose of further rationalizing of the processes.

Nevertheless, loading of different additives just prior to the direct film formation line or direct spinning line for the purpose of achieving different grades is associated with a serious drawback in that the appearance of disturbances is directly produced in the products when the density and quality are non-uniform. Because of this drawback, the step of direct film formation or direct spinning from continuous polymerization currently involves a serious problem whereby it is impossible to eliminate streaks which often occur with time in the polymer quality during direct transport of the fully polymerized polymer through the withdrawal line to the molding step.

In order to solve this problem, it has become common to employ kneading systems which melt the master batch with the molten polymer in the polymer withdrawal line of the continuous polymerization system. In such systems, the use of static mixing apparatuses for admixture of master batches and polymers for production of modified polyesters of superior quality has become a publicly known technique, as has been proposed in Japanese Unexamined Patent Publication No. 59-126457 and Japanese Examined Patent Publication No. 4-14128.

Nevertheless, as was already mentioned, mixing techniques using such static mixing apparatuses involve no application of external energy during the mixing and thus have a major disadvantage in that they cannot be used for strong mixing, as opposed to techniques where the mixing is accomplished with forced external power. In addition to such problems, static mixing apparatuses also have another drawback in that, although the polymer is mixed by dividing the polymer flow in the plane perpendicular to the polymer flow, thus allowing a degree of uniform dispersion of the additive in that plane, no technique yet exists for elimination mixing streaks which occur in the direction of polymer flow. In other words, it is currently the case that there is absolutely no effect for elimination of streaks which occur with time in the direction of polymer flow.

Reexamination of master batch systems from this standpoint highlights the problem with master batch systems, that it is impossible to avoid streaks which occur with time in the polymer due to density and quality variations in the modifier-containing thermoplastic resin, i.e. the master batch, and rotation cycle streaks generated by the rotation cycle of the pump used for transport of the base polymer and modifier-containing polymer. Thus, master batch systems which employ static mixing apparatuses have not been suitable for direct film formation and direct spinning from continuous polymerization where changes occurring with time appear as variations in the quality of the products, and therefore a technique has been desired which would resolve this issue.

As has already been mentioned, continuous polymerization systems have the disadvantage of being unsuitable for small-scale production, but at present there is still an increasing need for higher functioning and diversification of resins with modifiers in continuous polymerization systems. Because of this situation, techniques such as proposed in Japanese Examined Patent Publication No. 46-37767 have been developed as attempts at production for diverse grades. According to such techniques, multiple molten polymers at different polymerization stages in a continuous polymerization apparatus made from a multistage polymerization can are appropriately taken out from the polymerization can and blended, and used in composite form or alone as single polymers to obtain polyesters with different polymerization degrees, or the polyesters are combined in an appropriate fashion. Multi-grade techniques have also been proposed which include the procedure of this technique for production of composite fibers with latent crimping performance both efficiently and in combinations of ample variety.

It is true that this technique is advantageous in allowing compound fibers with combinations of different polymerization degrees to be manufactured by adjustment of the polymerization degree or mixing ratio of the polymer upon branching of the polymer composing the composite fibers from multiple polymerization cans. However, this technique merely combines a plurality of polymers at different polymerization stages in the manufacturing process for a single polymer produced in a continuous manner by continuous polymerization and is therefore limited in terms of diversification of grade, while various modifiers cannot be added for higher grade diversification and differentiation of polymer functions.

In an attempt to improve these drawbacks of the prior art processes, the present inventors have endeavored to provide a modified thermoplastic resin composition sufficiently flexible for diversification and multigrade production, as well as a production process therefor, by means of a mixing system which can give highly dispersable thermoplastic resins exhibiting no streaking with time and which allows uniformly dispersed mixing of various modifiers therein for adaptability to direct film formation and direct spinning.

In other words, the present invention provides a modified thermoplastic resin composition with excellent dispersability of modifiers in the thermoplastic resin and with good mold working properties or functions for molding of resin products in addition to high dispersability without producing streaks with time, as well as a process for its preparation. As a result, particularly in cases where the obtained thermoplastic resin composition is to be supplied from the continuous polymerization step to a direct film formation or direct spinning step, it is possible to accomplish continuous production of modified thermoplastic resins which are free from such changes which occur with time.

DISCLOSURE OF THE INVENTION

It is therefore an object of the present invention to provide a process for preparing modified thermoplastic resin compositions wherein modifiers are added uniformly to continuously polymerized thermoplastic resins in a molten state to result in excellent uniform dispersability and no streaks occurring with time, as well as modified thermoplastic resin compositions obtained by the process.

In order to achieve the aforementioned object, the present invention comprises incorporating at least one modifier-containing thermoplastic resin into the transport line of a continuously polymerized thermoplastic resin for continuous production of a modifier-containing thermoplastic resin composition, and subjecting the resins to static mixing and dynamic mixing in the transport line.

According to the invention, the dynamic mixing is accomplished by sending the resin through a dynamic mixing apparatus having a mixing blade unit and a power unit which drives it. The dynamic mixing apparatus used for the dynamic mixing according to the invention may be a complete mixing tank or a kneading extruder. In the case of a complete mixing tank, the mixing blade unit preferably comprises one selected from the group consisting of double helical ribbon blades, anchor blades, double motion paddle blades, helical screw blades, MIG blades and helicon blades, from the standpoint of eliminating streaks which occur with time in continuously polymerized thermoplastic resins.

The modifier-containing thermoplastic resin composition of the invention is obtained by the process of the invention described above, which involves incorporating at least one type of modifier-containing modified thermoplastic resin into the transport line for a molten thermoplastic resin for continuous production of the modified thermoplastic resin composition, wherein the filtration pressure increase rate is no greater than 10 kg/cm$^2$/hr when filtration is performed using a double layer of 2400 mesh wire filters with an inner diameter of 64 mm$\phi$, at a melting point of the modified thermoplastic resin or a temperature of from 20° C. to 100° C. higher than the plasticizing point of the resin and at a filtration rate of 33.3 g/min.

BEST MODE FOR CARRYING OUT THE INVENTION

Figure 1:
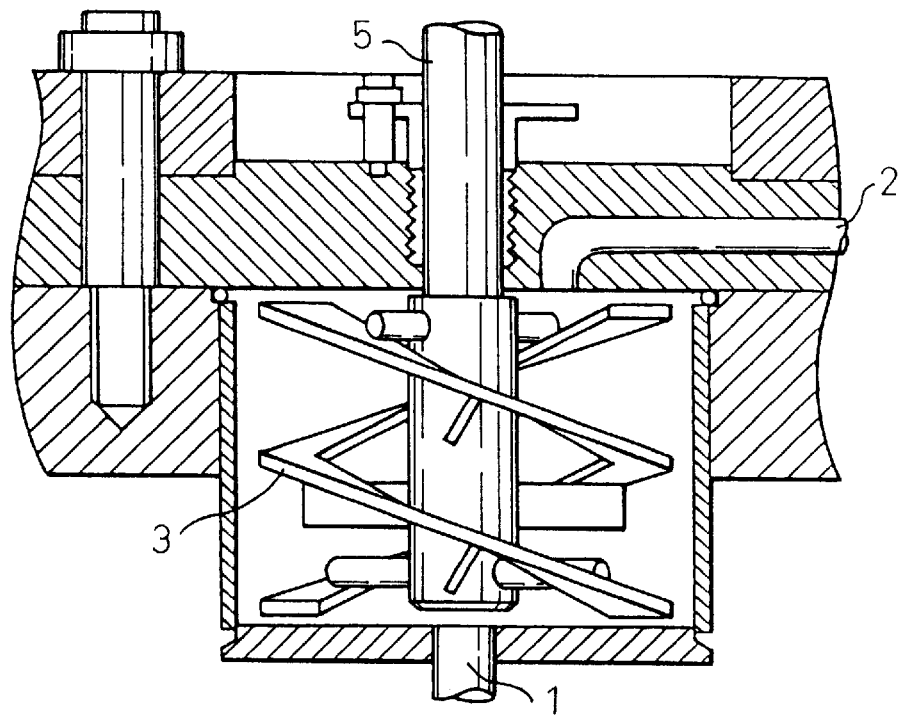
FIG. 1 and FIG. 2 are front cross-sectional views of embodiments of a dynamic mixing apparatus for mixing of modified thermoplastic resins by external power, used to accomplish the process of the invention.

The best mode for carrying out the invention will now be explained in detail.

It must first be stated that according to the invention, "Thermoplastic resin", "Modifier-containing thermoplastic resin" and "modified thermoplastic resin" are each considered to be clearly distinct as "resins with different properties".

"Thermoplastic resin" as used according to the invention encompasses thermoplastic resins which are crystalline or amorphous resins exhibiting thermoplasticity, examples of which include polyesters, polyamides and other polycondensation polymers, polyurethanes and other addition condensation polymers, polyethylene, polypropylene, polystyrene, polyvinyl chloride, methacrylic resins such as polymethyl methacrylate and other vinyl-based polymers. According to the invention there is no problem with thermoplastic resins which already include particles or additives, or which have been copolymerized, so long as they maintain their properties. The "thermoplastic resin" may also be referred to as "base polymer" or "straight polymer".

"Modifier-containing thermoplastic resin" according to the invention refers to the resin itself or a resin different from the resin itself which has been polymerized in a polymerization apparatus, and contains dispersed therein any publicly known modifier such as mentioned above, and/or the resin copolymerized with a third functional component. It is preferred for the resin component of the modifier-containing thermoplastic resin to be compatible with the thermoplastic resin, and it is more preferred for it to be identical. This is because compatibility with the thermoplastic resin will improve their mixing and result in better and more uniform dispersion.

Examples for the "modifier" according to the invention include inorganic particles of titanium oxide, silicon oxide, calcium carbonate, kaolinite, talc, alumina, zeolite, graphite or barium sulfate, and organic particles of polystyrene, polymethyl methacrylate, methyl methacrylate copolymers, methyl methacrylate crosslinked copolymers, polytetrafluoroethylene, polyvinylidene fluoride, polyacrylonitrile, benzoguanamine resin or crosslinked silicone resin. These particles may also be coated on their surface with a compound different from the internal composition of the particles, such as proposed in Japanese Unexamined Patent Publication No. 7-247119 and Japanese Unexamined Patent Publication No. 4-7336, for example, and they may even be treated with a silane coupling agent and/or titanium coupling agent. Industrially preferred among these are particles of silicon oxide, titanium oxide, alumina, polystyrene and crosslinked silicone resins, or these particles whose surfaces have been coated with other compounds.

Organic and/or inorganic particles with a mean particle size preferably in the range of 0.01–5 $\mu$m are preferred for use because of their excellent function as lubricants and/or non-transparent modifying function. Titanium oxide which has 3 types of crystal systems has been widely used according to the prior art, and of its 3 types of crystal systems, the anatase type is especially preferred for its excellent hue in modified thermoplastic resin compositions due to the fact that its absorption wavelength is not in the visible range, as well as for less deterioration of the resin during kneading.

On the other hand, the non-copolymerized functional modifier should be added upon appropriate selection of a modifier based on the type of thermoplastic resin and the desired modification, and it is not particularly restricted. Some uses of modifiers, or "non-copolymerized functional modifiers" as functional agents, include their use as flame retardants, electrostatic agents, dyeing aids, heat-resistant materials, antioxidants, bathochromatic agents, crystalline modifiers, ultraviolet absorbers, ultraviolet stabilizers and the like.

For example, as flame retardants there may be mentioned triethyl phosphate, tris($\beta$-chloroethyl) phosphate, xylenyldiphenyl phosphate and other phosphorus compounds, antimony trioxide and other antimony compounds, zirconium hydroxide, etc.

As electrostatic agents there may be mentioned fatty acid ester metal salts, alkylsulfonates and alkylbenzenesulfonic acids. Among these, alkylbenzenesulfonic acids are widely used in various resins, and mixtures of different molecular weight agents are commercially available for obtaining adequate electrostatic performance; however, those with an average carbon number of 30 or less are preferred from the standpoint of electrostatic performance and thermal stability.

As dyeing aids there may be mentioned polyalkylene glycols including polyethylene glycol. Polyethylene glycols of different molecular weights exist, but for the present use a larger molecular weight is preferred to form a larger amorphous portion, and the molecular weight is preferably at least 4000.

As bathochromatic agents there may be mentioned calcium trimethylphosphate, magnesium quaternary phosphonium isophthalate, etc.

As heat-resistant agents there may be mentioned normal phosphates, phosphites, etc.

As crystalline modifiers there may be mentioned benzoic acid, p-oxybenzoic acid, β-naphthoic acid, etc.

As antioxidants there may be mentioned 2,6-di-t-butyl-p-cresol and other phenolic antioxidants, 2,2'-methylenebis(4-ethyl-6-t-butylphenol) and other bisphenolic antioxidants, tetrakis-(methylene-3-(3',5'-di-t-butyl-4'-hydroxyphenyl) propionate) methane and other polyphenolic antioxidants, distearyl-3,3'-thiodipropionate and other sulfuric antioxidants, triphenylphosphate and other phosphoric antioxidants, etc.

As ultraviolet absorbers there may be mentioned p-t-butylphenyl salicylate and other salicylic acid-based absorbers, 2,4-dihydroxybenzophenone and other benzophenone-based absorbers, 2-(2'-hydroxy-5'-t-butylphenyl)benzotriazole and other triazole compounds, etc.

As ultraviolet stabilizers there may be mentioned bis(2, 2,6,6-tetramethyl-4-piperidyl) sebacate and other hindered amine compounds.

As modifier-containing thermoplastic resins which have copolymerized third components there may be mentioned, for example, vinyl-based polymer resins which are often random copolymerized with non-vinyl-based polymers, and polypropylene with polyethylene and 1-butene as moldable modifiers. Taking polyester as an example for the polycondensation polymer resin, 5-sodiumsulfoisophthalic acid or an ester-forming derivative thereof, or a quaternary phosphonium substituted salt thereof may be used as a dye clarity agent, and isophthalic acid, adipic acid, sebacic acid or an ester-forming derivative thereof may be used as a moldable modifier. As physical modifiers containing diol components there may be mentioned diethylene glycol, triethylene glycol, polyethylene glycol, bisphenol A ethylene oxide addition products, etc. However, while polyethylene glycol is widely used because of its low cost and readily exhibited modifying function, when used for the purpose of the invention it must be copolymerized with the resin and therefore its preferred molecular weight range is 4000 or less.

The modifier included in the modifier-containing thermoplastic resin may be of a single type or of several types. Also, particles, a non-copolymerized modifier or a copolymerizable modifier may also be included.

According to the invention, the weight ratio of the modifier used to prepare the modifier-containing thermoplastic resin may be appropriately selected depending on the content in the finally obtained modified thermoplastic resin. For example, if the viscosity of the thermoplastic resin is to be increased by addition of the modifier, it may be advantageous for the added modifier to be at a high concentration since more shear force will be necessary and the dispersion will be better, but when added to the base polymer as a modifier-containing thermoplastic resin, the relative amount of the modifier-containing thermoplastic resin will be lower, requiring a greater amount of the distributed mixture. An ideal value therefore exists for the modifier concentration in the modifier-containing thermoplastic resin. An ideal value also exists for cases where the viscosity is lowered as well as cases where it is increased.

Here, the suitable range for the modifier content in the modifier-containing thermoplastic resin will differ depending on the combination of the thermoplastic resin and the modifier, but preferably it is a range of 0.01–70 wt % based on the total weight of the modified thermoplastic resin, and the concentration of the modifier may be appropriately determined for the ideal concentration within this range. If the content is less than 0.01 wt % the dilution degree during production of the modified thermoplastic resin composition will be too low, thus restricting its quantization. There is also little industrial reason in lower amounts since no further cost merit is realized. On the other hand, with a concentration higher than 70 wt % the modifier undergoes thermal degradation during preparation of the modifier-containing thermoplastic resin, and the decomposing property of the modifier causes decomposition of the resin, lowering its quality and tending to result in agglutination of foreign matter with the modifier. When such thermal degradation and decomposition products or agglutinates are formed, they contaminate the modified thermoplastic resin, and undesirably lower the quality of the resulting modified thermoplastic resin.

According to the invention, mixing of the modifier-containing thermoplastic resin with the thermoplastic resin obtained from continuous polymerization containing no additive is preferably carried out in the transport line for the thermoplastic resin (hereunder referred to as "transport liner"), and one method for supplying the molten thermoplastic resin to the transport line involves first converting the thermoplastic resin into chips and drying, followed by further melt mixing in a kneading extruder; another method involves taking a side stream from the transport line of the thermoplastic resin, mixing the modifier therewith to above the prescribed concentration to make an intermediate preparation, and then returning it to the transport line of the base thermoplastic resin. The method employed may be selected for the appropriately ideal conditions in conformity with the operating conditions, and it will differ, for example, depending on the planned intrinsic viscosity of the thermoplastic resin, the frequency of grade switching and the ease with which the production apparatus can be cleaned.

According to the invention, preparation of the modifier-containing thermoplastic resin may be accomplished by adding the modifier directly to the thermoplastic resin which has been continuously polymerized and withdrawn, or by adding the modifier to the thermoplastic resin which has been obtained through a separate step involving chipping of the continuously polymerized thermoplastic resin.

According to the invention, in the mixing procedure for obtaining the modified thermoplastic resin by mixing the modifier-containing thermoplastic resin with the thermoplastic resin which is the base polymer prior to addition of the modifier, it is essential for the static mixing procedure involving no external power to be combined with a forceful dynamic mixing procedure involving external power.

Here, "static mixing" as used according to the invention means repeated division of the modified thermoplastic resin stream in a cross-section perpendicular to the direction of flow and mixing by dispersion and distribution. This static mixing is useful for example in cases where the modifier has already been dispersed to some degree of uniformity in the modified thermoplastic resin, to allow mixing to some degree in a relatively smooth manner without applying external power for addition of a large forceful shear force for the mixing. A conventional publicly known apparatus may be used as the static mixing apparatus to allow such static mixing, and suitable examples of commercially available static mixing apparatuses include the Kenix Static Mixer first produced by Kenix Co., the Sulzer Static Mixing Element first produced by Sulzer Co., and the Highmixer (trade name) produced by Toray, KK.

Incidentally, as regards the number of dividing elements in the static mixer for repeated division of the polymer stream in a cross-section perpendicular to the direction of flow in order to achieve a sufficiently uniform dispersion, if the Kenix Static Mixer is taken as an example, the number of dividing elements per static mixer is preferably 10 elements or more. This will be obvious in light of the object of the invention which is to obtain a modified thermoplastic resin with a high degree of uniform dispersion. For other static mixing apparatuses with different dividing systems for the polymer, there is no need to explain here the details for the number of dividing elements since it is a matter of selecting the conditions and any person skilled in the art may choose the number of dividing elements suited for the quality demanded for each modified thermoplastic resin.

However, it has already been mentioned in regard to the problems of the prior art that kneading streaks which occur with time cannot be eliminated with modified thermoplastic resins through simple static mixing, and therefore the "dynamic mixing" according to the invention is essential to overcome this problem. According to the invention, "dynamic mixing" means "feeding the modified thermoplastic resin to a dynamic mixing apparatus and/or kneading extruder equipped with a mixing blade driven by external power, and mixing for a prescribed residence time".

Here, the preferred apparatus for adequate "dynamic mixing" may be exemplified by complete mixing tanks and kneading extruders. According to the invention, a "complete mixing tank" is "a can-like mixing tank with a mixing blade unit driven by external power", and the tank shape, tank dimensions, liquid depth, etc. of the "complete mixing tank" may be such as ideally match the production conditions, and the ideal conditions may be appropriately selected based on the production conditions for the modified thermoplastic resin.

The form of the mixing blade may be any publicly known blade form used for high viscosity mixing/distribution, and many different types of mixing systems may be implemented. For example, double helical ribbon blades, anchor blades, double motion paddle blades, helical screw blades, MIG blades and helicon blades are particularly preferred for use because of their superior mixing capabilities. The blade-to-wall clearance, the blade pitch, blade width and blade number may be chosen as suitable for the production conditions. In the case of double helical ribbon blades, helical screw blades and MIG blades, the mixing system may be an upward agitating system or a downward agitating system.

According to the invention, a high mixing rotation rate is preferred to accelerate the mixing, but for highly viscous polymers an excessively high rotation rate is not preferred as the blade material strength may be insufficient or the required mixing power may be too great. The preferred mixing rotation rate is therefore 1–30 rpm.

According to the invention, the dynamic mixing requires the modified thermoplastic resin to have a prescribed residence time in the dynamic mixing apparatus in order to eliminate streaking with time. The present inventors have sought to determine the conditions which satisfy this requirement, and have found that, if the total mixing number as defined as follows: "total mixing number (times)=rotation rate of the mixing blade (rpm)×residence time in the dynamic mixing apparatus (min)", a total mixing number of 100 or greater in the dynamic mixing apparatus can provide sufficient dynamic mixing regardless of the mixing system or mixing blade form of the dynamic mixing apparatus. The total mixing number is more preferably 150 or greater.

However, it is not preferred for the modified thermoplastic resin to reside for a very long time because this will promote thermal degradation of the polymer in the dynamic mixing apparatus. Consequently, in order to prevent thermal degradation of the modified thermoplastic resin in the dynamic mixing apparatus the residence time in the dynamic mixing apparatus is preferably less than 20 minutes, and more preferably less than 15 minutes.

According to the invention, a vent line may be provided in the "complete mixing tank". For example, in the case of dynamic mixing of a polycondensation-type modified thermoplastic resin, provision of a vent line will allow a vacuum to be maintained in the complete mixing tank to control reductions in intrinsic viscosity of the modified thermoplastic resin in the tank.

When a "kneading extruder" is used for dynamic mixing according to the invention, it is preferably an extruder equipped with a screw having a mounted disk segment for extrusion and/or kneading of the resin. The number of screws may be single, twin or multiple, but in terms of equipment cost and safety a single screw or twin-screw kneading extruder is preferred. The reason for using a kneading extruder for the dynamic mixing is that a kneading extruder has a function for kneading of the resin while maintaining a prescribed residence time, and thus makes it possible to eliminate streaks which occur in the modified thermoplastic resin with time.

The construction of the disk incorporated in the screw may be an appropriate screw construction suited for the purpose, since the ease of dispersion of the modifier will differ depending on the type and melt viscosity of the resin and the type of modifier. In order to further increase the residence effect of the resin in the kneading extruder, the screw preferably has a backward feed segment mounted thereon in at least one location. This is because provision of backward feed means in the kneading extruder will allow backward feeding of a portion of the modified thermoplastic resin transported in the kneading extruder against the direction of transport, thus helping to eliminate mixing streaks which can occur with time. Also, the rotation rate of the screw may be within a range which sends the resin through normally and does not excessively raise the temperature of the resin by the shear stress, and such a range is acceptably 100–500 rpm, for example. In order to prevent thermal degradation caused by a long residence time, the residence time of the modified thermoplastic resin in the extruder is preferably not more than 15 minutes. The kneading extruder used for the invention may be one without a vent, but preferably one with a vent is used.

According to the invention, when at least one static mixing apparatus and dynamic mixing apparatus are installed, they may be situated in such a manner that the static mixing apparatus is first in the line followed by the dynamic mixing apparatus, but alternatively the dynamic mixing apparatus may be situated first with the static mixing apparatus following it. The setting of the apparatuses may be appropriately selected in consideration of the type of modifier, the polymer viscosity, the installment location of the apparatus and its washability.

According to the invention, when using a static mixing apparatus and a dynamic mixing apparatus, as two different types of mixing apparatuses with vastly different mixing modes, two or more of at least one of the types may be used to give the modified thermoplastic resin more satisfactory mixing properties. In such cases, two or more static mixing apparatuses arranged in series or parallel may be used for static mixing, followed by dynamic mixing with a dynamic mixing apparatus installed downstream, or dynamic mixing may be followed by static mixing with two or more static mixing apparatuses arranged in series or parallel. Alternatively, static mixing may be followed by dynamic mixing with two or more dynamic mixers arranged in series or parallel.

When the static mixing procedure or dynamic mixing procedure is carried out multiple times in this manner, they may have identical mixing systems, but will preferably have different systems in order to obtain superior mixing properties.

In the case of static mixing, for example, combination of least 2 different static mixing systems each with a different "number of divisions and/or division forms for the resin in the plane perpendicular to the direction of resin flow" can provide a more complex mixing stream.

In the case of dynamic mixing using a complete mixing tank, the size of the mixing tank, the form of the mixing blade and the mixing speed may be changed or, when using a kneading extruder, the structure of the screw segment or the rotation rate of the screw may be changed, to employ different "mixing systems" with different polymer residence times and mixing numbers, for more complex mixing of the polymer stream. A complete mixing tank and a kneading extruder may also be used in combination.

For a complex static mixing procedure or dynamic mixing procedure such as described above, the arrangement of the mixing apparatuses which will give the best mixing efficiency is one where the static mixing apparatus and dynamic mixing apparatus are alternated for alternating static mixing and dynamic mixing. In such cases, the alternate mixing procedure is preferably carried out at least 2 times, with one time for the mixing procedure being counted as either the static mixing procedure or the dynamic mixing procedure. Here, there is no problem whether the first mixing procedure is the static mixing procedure or the dynamic mixing procedure, and for example, the static mixing procedure may be carried out before the dynamic mixing procedure, or the dynamic mixing procedure may be carried out before the static mixing procedure. In this type of mixing procedure, an excellent mixing effect may be achieved by a three-time mixing procedure in the order of static mixing, dynamic mixing, static mixing of the polymer, or by a two-time mixing procedure with dynamic mixing followed by static mixing. One reason the former mixing example is preferred is that, depending on the flow properties of the polymer in the dynamic mixing apparatus used for dynamic mixing, mixing streaks may reoccur in the plane perpendicular to the direction of flow of the polymer. That is, even if the polymer is mixed in the plane perpendicular to the polymer flow in the static mixing, the subsequent dynamic mixing may produce mixing streaks in the plane perpendicular to the direction of polymer flow at the stage when it is mixed in the direction of polymer flow (i.e., in the direction of movement with time). Consequently, even in cases where such mixing streaks have occurred, the subsequent static mixing procedure can eliminate the mixing streaks in the plane perpendicular to the direction of polymer flow, to reproduce a uniform dispersion.

The latter mixing example provides a particularly favorable effect in cases of large variation in the concentration of the thermoplastic resin and/or the modifier-containing thermoplastic resin, and in cases of poor dispersion of the modifier-containing thermoplastic resin. That is, after adding the thermoplastic resin having the modifier-containing thermoplastic resin as the base, if it is first subjected to dynamic mixing to provide initial uniformity for the time streaks and then to static mixing, the distributed admixture of the resins in the static mixing apparatus will progress in a very smooth manner, after which the dynamic mixing can completely eliminate the time streaks in the resin quality caused by the effect of drift currents during the dynamic mixing.

However, any increase of dynamic mixing apparatuses or static mixing apparatuses beyond what is necessary is not preferred since the improving effect of the kneading (uniform dispersion) of the modifier will reach a maximum at a certain level, while various disadvantages will also be manifested such as increased equipment cost, complicated maintenance and quality deterioration with the longer residence time of the polymer in the mixing apparatuses. Thus, while much will depend on the production conditions for the modified thermoplastic resin, the number of mixing apparatuses installed is generally preferred to be 5 or less, including both static mixing apparatuses and dynamic mixing apparatuses.

According to the invention, the transport line, such as a withdrawal line, for the base thermoplastic resin may have multiple branches with the modifier-containing thermoplastic resin added and mixed with each branched line, to allow simultaneous production of multiple modified thermoplastic resin compositions. This method is highly useful industrially since it is readily suitable for grade diversification. In such cases, the preferred construction is one in which the straight polymer as the base is prepared by a continuous polymerization process and then branched into multiple lines at the polymer withdrawal port. Also, by adding a modifier-containing thermoplastic resin containing titanium oxide particles as the modifier at different amounts in the branched lines, it is possible to simultaneously produce multiple grades with different dullnesses, such as straight polymers, bright polymers, semi-dull polymers and full-dull polymers. It thus becomes possible to easily vary in a mobile manner the amounts of the additive-containing thermoplastic resin with respect to the base polymer in response to changes in demand or stock, for very effective grade diversification and adjustment of production volume in different circumstances.

Moreover, in a transport line such as the withdrawal line for the base polymer, a system may be adopted whereby two or more modifier-containing thermoplastic resin compositions are added. In such a system, the modifier-containing thermoplastic resins may be separately pelleted and the pellets blended and loaded into an extruder for melting, and finally added into the withdrawal line for the base polymer. Alternatively, the different modifier-containing thermoplastic resin compositions may be loaded into the withdrawal line for the base polymer through kneading extruders provided for each of the different modifier-containing thermoplastic resin compositions.

The process of the invention can provide a uniform dispersion of various particles or modifiers by the high degree of uniform dispersability, but it is also possible to knead together multiple master batches to provide multiple modifying functions. For example, with polyester resins, a titanium oxide master batch and a 5-sodiumsulfoisophthalic acid copolymer master batch may be combined and added simultaneously to provide the simultaneous modifying effects of opaqueness and cationic dyeability.

The content of the modifier in the modified thermoplastic resin according to the invention may be appropriately selected based on the type of resin, type of modifier and the target quality for the resin composition. However, the preferred modifier content range is 0.001–50 wt % based on the total weight of the modified thermoplastic resin composition. It is preferably not under 0.001 wt % as the function of the modifier will not be expressed. Also, at an excess of 50 wt % the quality of the resin composition will be impaired by the modifier, and the properties will be inferior and unable to withstand use after molding into a film, resin or fibers.

The modifier content of the modifier-containing thermoplastic resin used according to the invention may also be appropriately selected depending on the type of resin, type of modifier and target quality for the resin composition, but the preferred range is 0.01–70 wt % based on the total weight of the modifier-containing thermoplastic resin.

According to the invention, a particularly high distribution mixing effect is seen with polyester resins which are known to undergo a chemical redistribution reaction between molecular chains of the thermoplastic resin. Copolymerized polyesters are especially favorable for randomizing the modifier by the redistribution reaction.

As mentioned above, the process of the invention makes it possible to produce modified thermoplastic resin compositions while maintaining a highly uniform dispersion of various modifiers, and to prevent streaking with time, so that the resulting modified thermoplastic resin composition also has highly uniform dispersability which is not seen with the prior art. As a result, the obtained modified thermoplastic resin compositions have large aggregate particles and a low degree of foreign matter from thermal decomposition.

The modified thermoplastic resin obtained in this manner exhibits a very high degree of uniform dispersability, as evidenced by a filtration pressure increase rate of no greater than 10 kg/cm$^2$/hr when filtration is performed using a double layer of 2400 mesh wire filters with an inner diameter of 64 mm$\phi$, at the melting point of the modified thermoplastic resin or a temperature of from 20° C. to 100° C. higher than the plasticizing point of the resin and at a filtration rate of 33.3 g/min. In the case of modified polyester resins, a particularly high degree of uniform dispersability is exhibited, with a filtration pressure increase rate of no greater than 10 kg/cm$^2$/hr and especially less than 5 kg/cm$^2$/hr, when filtration is performed at a temperature of 290° C.

The modified thermoplastic resin of the invention exhibits its effect particularly with polyester resins which give a high dispersing effect by redistribution reaction. Polyester compositions containing particles or non-copolymerizable modifiers in the polymer line of the base polyester and polyesters with copolymerized modifiers, which are obtained by the process of the invention, have the modifiers highly dispersed in the resin and thus make it possible to obtain compositions with low resin pressure variations and quality streaks in steps for molding fibers, films and the like.

Embodiments for carrying out the process of the invention will now be explained in the form of examples, after first explaining the drawings which illustrate the steps and apparatuses used for the examples.

Figure 2:
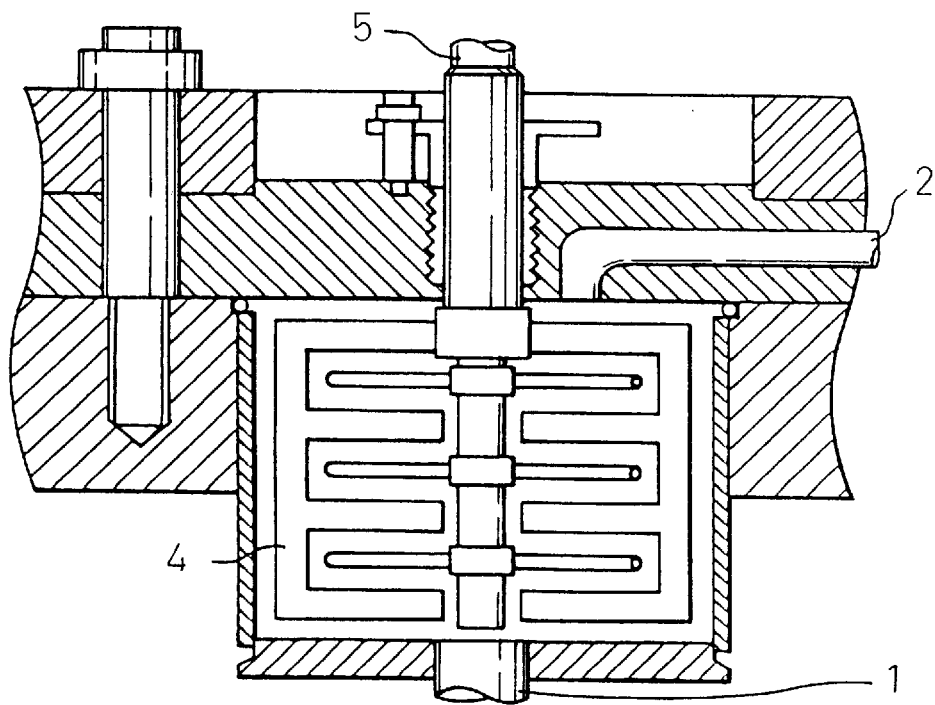

FIG. 1 and FIG. 2 are illustrations of dynamic mixing apparatuses used for the invention. In these illustrations, 1 is a polymer inlet, 2 is a polymer outlet, 3 is a double helical ribbon blade, 4 is a double motion paddle blade. The mixing system of the double helical ribbon blade 3 may be either an upward agitating system or a downward agitating system. Also, 5 is a driving axle for driving of the mixing blade by external power.

Figure 3:
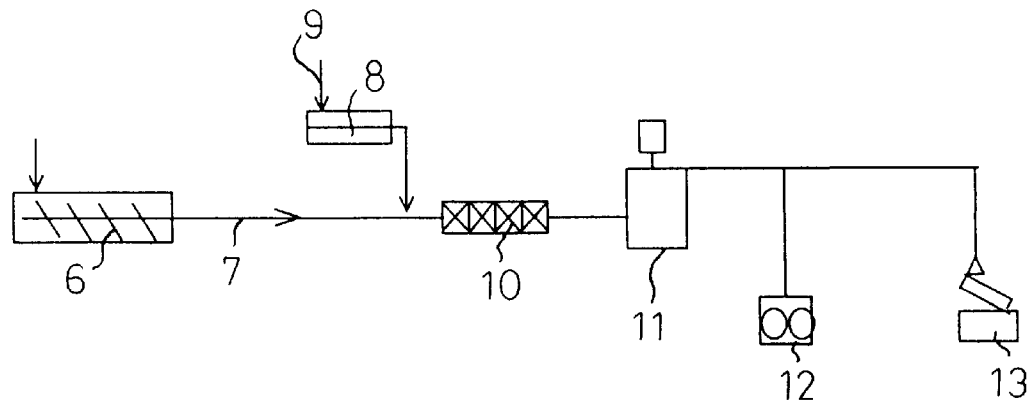
FIGS. 3 to 13 and FIG. 17 are simplified process diagrams illustrating different embodiments of the invention, which are for dynamic mixing using the dynamic mixing apparatuses shown in FIG. 1 and/or FIG. 2.

In FIG. 3, 6 is an extruder for melting of the thermoplastic resin, and 7 is a withdrawal line for the molten thermoplastic resin. The modifier-containing thermoplastic resin is loaded into the kneading extruder indicated by 8 from the loading port 9 of the kneading extruder 8, and added into the withdrawal line 7. The base thermoplastic resin and the added modifier-containing thermoplastic resin are fed to a static mixer 10, and repeated division of the polymer stream accomplishes divided mixing in the direction perpendicular to the resin flow. The polymer mixture which has passed through the static mixer 10 in this manner is then sent to a dynamic mixing apparatus 11. At the dynamic mixing apparatus 11, it is agitated by a mixing blade provided in connection with the mixing blade driving axis shown in FIG. 1, and then sent to a film forming step and/or direct spinning step 12, and a chipping step 13.

Figure 4:
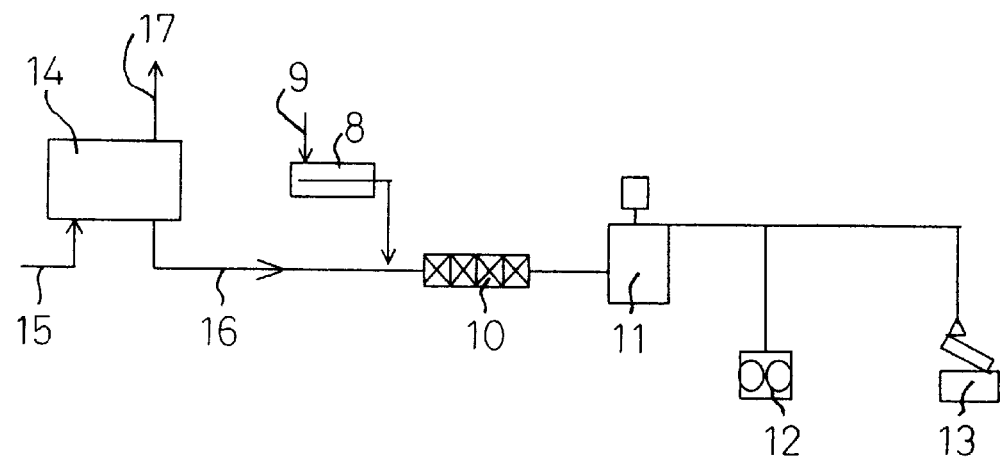

FIG. 4 is another example of the invention, where 14 is the final reactor for continuous polymerization, 15 is the entrance port for the polymerization reactor, and 16 is the withdrawal line for the completely polymerized polymer. Also, 17 is a vacuum system. In the step having this construction, the modifier-containing thermoplastic resin is loaded into the kneading extruder indicated by 8 through the loading port 9 of the kneading extruder, and is added into the polymer withdrawal line 16. The base thermoplastic resin and the added modifier-containing thermoplastic resin are fed to a static mixer 10, and repeated division of the polymer stream in the plane perpendicular to the direction of flow accomplishes uniform distributed mixing. The modified polymer which has passed through the static mixer 10 in this manner is then sent to a dynamic mixing apparatus 11. At the dynamic mixing apparatus 11, it is agitated by a mixing blade provided in connection with the mixing blade driver 5 shown in FIG. 1, and then sent to a direct film forming step and/or direct spinning step 12, and a chipping step 13.

Figure 5:
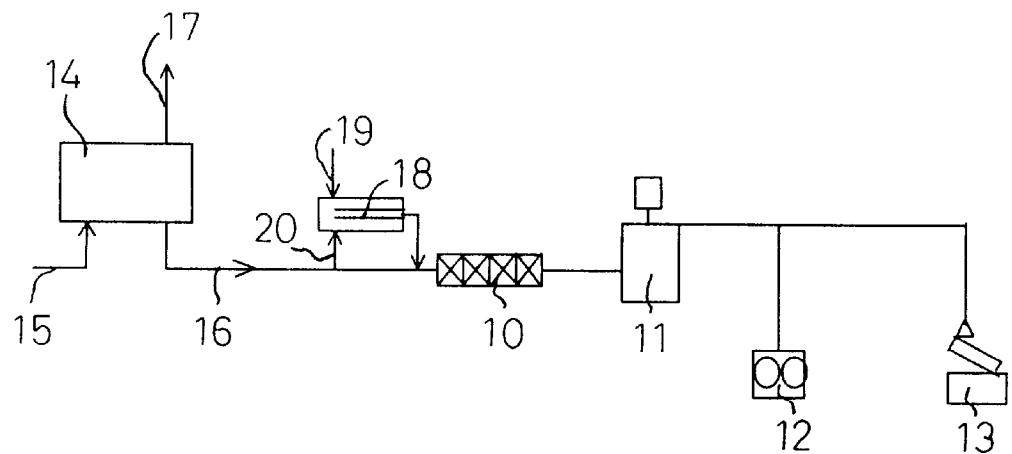

FIG. 5 shows another embodiment of the invention, which is a simplified view of the example of FIG. 4. Here, 14 is the final reactor for continuous polymerization, 15 is the entrance port for the polymerization reactor, and 16 is the withdrawal line for the completely polymerized polymer. In this step, a portion of the base polymer withdrawn from the withdrawal line 16 is sent to a kneading extruder 18 as a side stream 20. The additive-containing polyester is prepared in the kneading extruder 18 by loading the modifier-containing polyester or the additive into the kneading extruder 18 through the loading port 19. The modifier-containing polyester prepared in the kneading extruder 18 is added back into the base polymer line 16, and then sent to a direct film forming step and/or direct spinning step 12, and a chipping step 13 after undergoing distributed mixing in the same manner as shown in FIG. 4.

FIGS. 6 to 13 are illustrations of still different examples of the process of the invention. Here, 21 is a static mixer, but it is a static mixer with a different number of divisions and/or dividing forms for the resin in the plane perpendicular to the polymer flow, compared to the separately provided static mixer 10. The dynamic mixing apparatus 22 is a dynamic mixing apparatus with a different blade type, tank shape and liquid depth than the dynamic mixing apparatus 11 provided separately.

Figure 14:
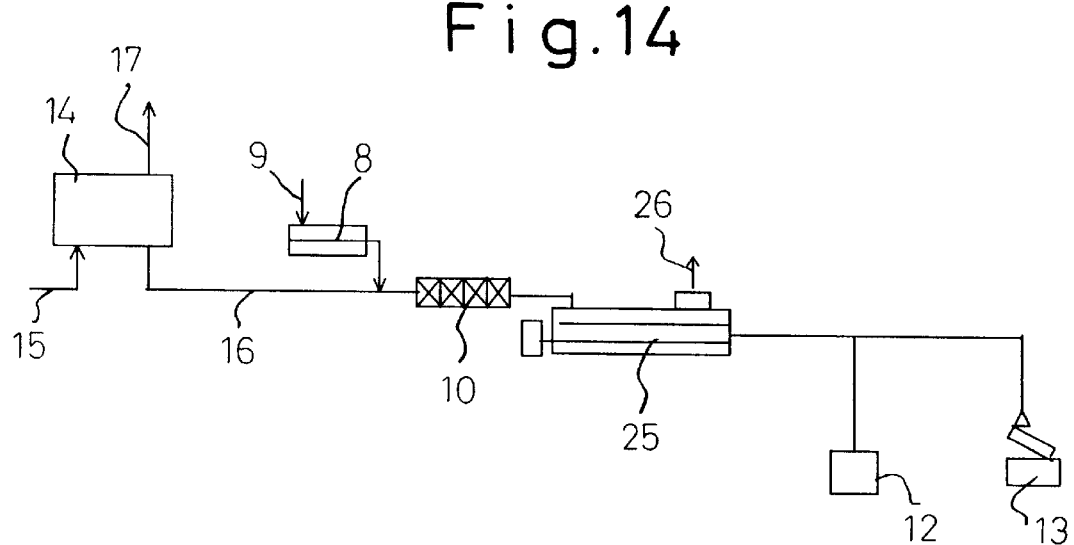
FIGS. 14 to 16 are simplified process diagrams illustrating different embodiments where kneading extruders are used as dynamic mixing apparatuses instead of the dynamic mixing apparatuses shown in FIG. 1 and/or FIG. 2.
Figure 15:
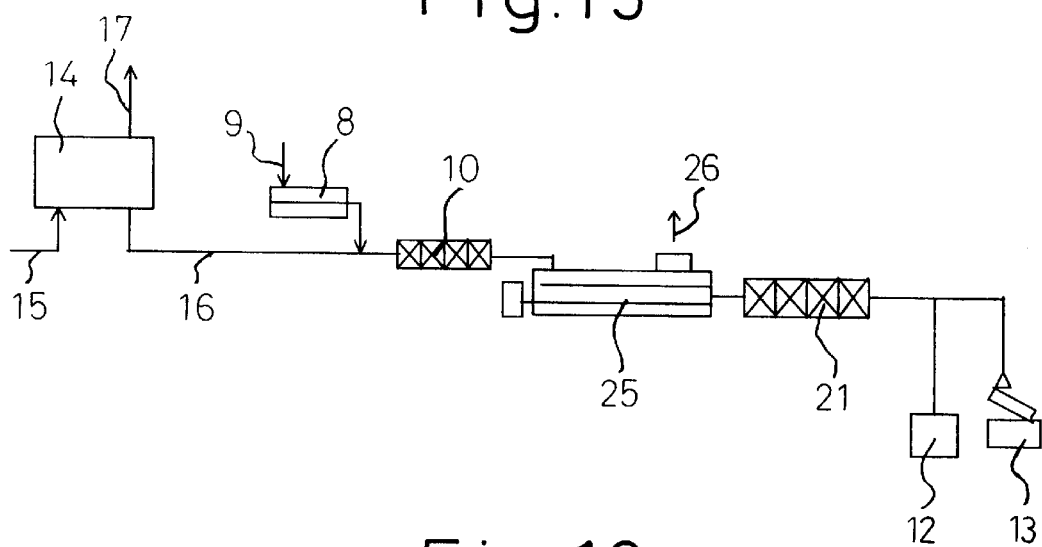
Figure 16:
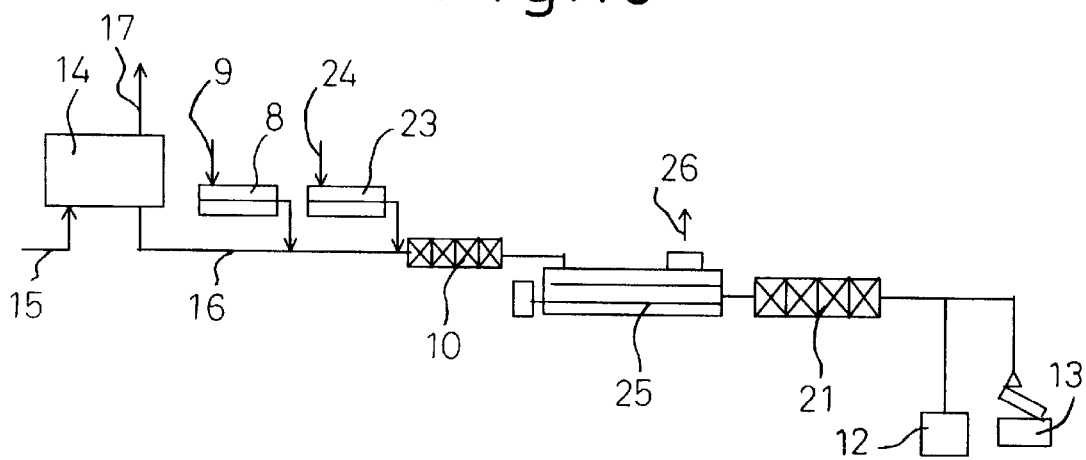

FIGS. 14 to 16 shows different examples of the invention, where 14 is the final reactor for continuous polymerization, 15 is the entrance port for the polymerization reactor, and 16 is the withdrawal line for the completely polymerized polymer. Also, 17 is a vacuum system. In this step, the modifier-containing thermoplastic resin is loaded into the kneading extruder indicated by 8 through the loading port 9 of the kneading extruder, and added into the polymer withdrawal line 16. If the modifier-containing thermoplastic resin is to be divided into two or added twice into the polymer withdrawal line 16, there is no problem with using a kneading extruder 23 in combination therewith. The base thermoplastic resin and the added modifier-containing thermoplastic resin are fed to a static mixer 10, and repeated division of the polymer stream in the plane perpendicular to the direction of flow accomplishes uniform distributed mixing. The modified polymer which has passed through the static mixer 10 is then sent to a twin-screw kneading extruder 25 which has a vent 26. After kneading at the vented twin-screw kneading extruder 25, it is sent to a direct film forming step and/or direct spinning step 12, and a chipping step 13.

Figure 17:
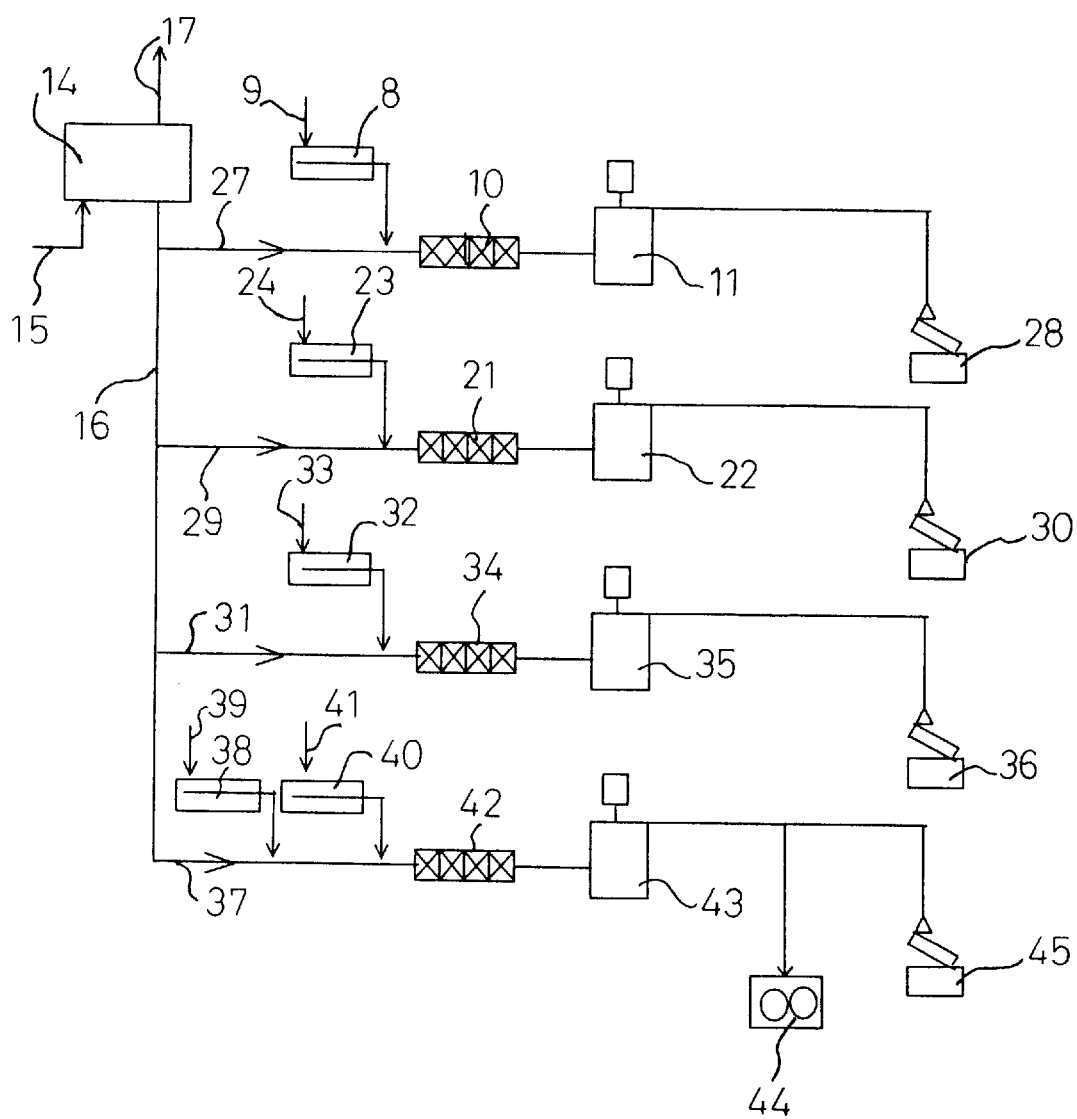

FIG. 17 shows another example of the invention. In this drawing, 14 is the final reactor for continuous polymerization, 15 is the entrance port for the polymerization reactor, and 16 is the withdrawal line for the completely polymerized polymer. Also, 17 is a vacuum system. Here, the withdrawal line 16 is further divided into 4 lines indicated by 27, 29, 31 and 37. In each of these 4 lines there are provided kneading extruders 8, 23, 32 for each of the withdrawal lines 27, 29 and 31. Two kneading extruders 38 and 40 are also provided in the withdrawal line 37.

In the process having this construction, the modifier-containing thermoplastic resins are added from the kneading extruders 8, 23, 32, 38 and 40 to the respective withdrawal lines 27, 29, 31 and 37. The withdrawal lines 27, 29, 31 and 37 are provided with respective static mixers 10, 21, 34 and 42, and each is also provided with one complete mixing tank 11, 22, 35 and 43. Kenix static mixers (number of dividing elements: 20) were used as the static mixers for 10, 34 and 42. The static mixer indicated as 21 was a Sulzer static mixer (number of dividing element: 18).

Upward agitating double helical ribbon blades were used in the complete mixing tanks 11, 35 and 43, while a double motion paddle blade was used for the one indicated by 22. The rotation rates of the mixing blades were all 12 rpm, and the residence times were 12 minutes in all cases.

In the process having this construction, polyethylene terephthalate with an intrinsic viscosity of 0.65 and no modifier was used as the base polymer obtained by esterification reaction and prescribed polycondensation reaction using terephthalic acid and ethylene glycol as the starting materials, and it was fed to 4 different withdrawal lines 27, 29, 31 and 37 each at volumes of 150 kg/hr. The temperature of all the base polymers at this time was kept at 285° C. Separately, the base chips and titanium oxide were supplied to the twin-screw extruder to prepare a master batch of polyethylene terephthalate containing 50% titanium oxide with a mean particle size of 0.35 $\mu$m (intrinsic viscosity: 0.49). In a separate batch system reactor there was also prepared a master batch copolymerized with 8 mole percent of 5-sodiumsulfoisophthalic acid.

A straight polymer was obtained without adding the master batch in the withdrawal line 27. The titanium oxide-containing master batch was added in the withdrawal line 29 at 0.91 kg/hr. The titanium oxide-containing master batch was added in the withdrawal line 31 at 7.9 kg/hr. In the withdrawal line 37 there were added the titanium oxide-containing master batch at 7.1 kg/hr and the 5-sodiumsulfoisophthalic acid-containing master batch at 21.4 kg/hr from the extruders 38 and 40, respectively.

The different physical values and properties according to the invention were measured in the following manner, with the definitions given below.

(1) Intrinsic Viscosity of Polyester Resin

Measured at 35° C. in a mixed solvent with 40 parts by weight of 1,1,2,2-tetrachloroethane and 60 parts by weight of phenol.

(2) Coarse Particles in Resin Composition

Fifty milligrams of the polymer was pressed between two cover glass plates in a molten state at 280° C., and after cooling, a phase contrast microscope was used for observation to count the number of particles with a maximum length of 5.0 $\mu$m or greater in a microscope image from a Luzex 500 image analyzer, with judgment made based on the following scale.

Special grade: Absolutely no particles found exceeding 5.0 $\mu$m.

First grade: Less than 5 particles/mm$^2$ exceeding 5.0 $\mu$m.

Second grade: 5–10 particles/mm$^2$ exceeding 5.0 $\mu$m.

Third grade: Over 10 particles/mm$^2$ exceeding 5.0 $\mu$m.

Only those of special grade and first grade are suitable for practical use.

(3) Filtration Pressure Increase Rate Upon Filtration of Resin Composition

A metered polymer supply apparatus was mounted at the molten polymer outlet end of the small-size single screw-type kneading extruder of a direct spinning apparatus while a double layer of 2400 mesh wire filters with an inner diameter of 64 mm$\phi$ was fitted on the outlet side, and the temperature of the polymer was controlled to either its melting point or a temperature of from 20° C. to 100° C. higher than its plasticizing point, for continuous filtration of the polymer for 10 hours at a filtration rate of 33.3 g per minute. The average pressure increase rate on the inlet side of the filter at this time was taken as the filtration pressure increase rate. The amount of particles added to the polymer for filtration was consistent at 0.3 wt %.

Special grade: Filtration pressure increase rate of no greater than 5 kg/cm$^2$/hr.

First grade: Filtration pressure increase rate of 5–10 kg/cm$^2$/hr.

Second grade: Filtration pressure increase rate of 10–20 kg/cm$^2$/hr.

Third grade: Filtration pressure increase rate of 20 kg/cm$^2$/hr or greater.

Only those of special grade and first grade are suitable for practical use.

(4) Dispersability of Particles in Polyester

After diluting with polyester (A) when necessary to adjust the amount of particles in the polyester to 0.3 wt %, the polyester extruded from the small-size single screw-type extruder was embedded in an epoxy resin and cut with a microtome, and the cross-section was observed with a scanning electron microscope (5000–10,000× magnification). The linear distances between 30 pairs of two adjacent particles were measured, the mean value, standard deviation and variation coefficient were determined and judged on the following scale.

Special grade: Variation coefficient of less than 0.05.

First grade: Variation coefficient of 0.05–0.1.

Second grade: Variation coefficient of 0.1–0.2.

Third grade: Variation coefficient of over 0.2.

Only those of special grade and first grade are suitable for practical use.

(5) Changes in Degree of Kneading with Time

A chip sample of the polymer discharged as the product was taken once for each 100 kg of discharged polymer, and upon measurement of the modifier content, the mean value, standard deviation and variation coefficient for 50 measurements were determined and judged on the following scale.

Special grade: Variation coefficient of less than 0.05.

First grade: Variation coefficient of 0.05–0.1.

Second grade: Variation coefficient of 0.1–0.2.

Third grade: Variation coefficient of over 0.2.

Only those of special grade and first grade are suitable for practical use.

The present invention will now be explained in further detail by way of specific examples.

EXAMPLE 1

In the process illustrated in FIG. 3, terephthalic acid and ethylene glycol were used as the starting materials for esterification reaction and prescribed polycondensation reaction to give polyethylene terephthalate chips with an intrinsic viscosity of 0.65 and, after drying by a common method, these were then supplied to a kneading extruder 6 at a volume of 900 kg/hr. The base polymer temperature at this time was kept at 285° C. Separately, the base chips and titanium oxide with a mean particle size of 0.35 μm were supplied to a twin-screw extruder (not shown) to prepare a master batch of polyethylene terephthalate containing 25% titanium oxide (intrinsic viscosity: 0.54), which was added into the transport line 7 through the kneading extruder 8 at a volume of 100 kg/hr. It was then distributed and mixed through a Kenix static mixer 10 with 20 dividing elements, and then directed to a complete mixing tank 11 equipped with a double helical ribbon blade 3 as shown in FIG. 1. Agitation was in the upward direction, and the rotation rate was 15 rpm. The residence time of the resin was set to be 12 minutes. The modified polyethylene terephthalate resin obtained in this manner was supplied to a direct spinning step 12 at 100 kg/hr, and the remaining portion was supplied to a chipping step 13.

Evaluation samples of the modified polymer were taken out from each step and, after chipping when necessary, the coarse particles in the chips, dispersability, changes in degree of mixing with time and the filtration pressure increase rate during spinning were evaluated. The results of the evaluation are shown in Table 1.

EXAMPLE 2

In the process illustrated in FIG. 4, terephthalic acid and ethylene glycol were used as the starting materials for esterification reaction and prescribed polycondensation reaction to give a non-modifier-containing polyethylene terephthalate as the base polymer with an intrinsic viscosity of 0.65, and this was supplied to a withdrawal line 16 from a final reaction tank 14 with the internal vacuum degree controlled by a vent 17, at a volume of 900 kg/hr. The base polymer temperature at this time was kept at 285° C. Separately, the base chips and titanium oxide were supplied to a twin-screw kneading extruder 8 through the loading port 9 to prepare a master batch of polyethylene terephthalate containing 25% titanium oxide with a mean particle size of 0.35 μm (intrinsic viscosity: 0.54), and this was added into the withdrawal line 16 through the twin-screw kneading extruder 8 at a volume of 100 kg/hr. The modified polymer was then distributed and mixed through a Kenix static mixer 10 (number of dividing elements: 20), and then directed to a complete mixing tank 11 equipped with a double helical ribbon blade 3 as shown in FIG. 1. Agitation was in the upward direction, and the rotation rate was 15 rpm. The residence time of the polymer was 12 minutes. The modified polymer obtained in this manner was supplied to a direct spinning step 12 at 100 kg/hr, and the remaining portion was supplied to a chipping step 13.

Evaluation samples of the modified polymer were taken out from each step and, after chipping when necessary, the coarse particles in the chips, dispersability, changes in degree of mixing with time and the filtration pressure increase rate during spinning were evaluated. The results of the evaluation are shown in Table 1.

EXAMPLE 3

In the process illustrated in FIG. 5, the same type of base polymer as in Example 2 was withdrawn into the withdrawal line 16 at a volume of 975 kg/hr, of which a 75 kg/hr volume of the base polymer was extracted out as a side stream 20 and supplied to a vented twin-screw kneading extruder 18 at a 25 kg/hr volume together with titanium oxide powder having a mean particle size of 0.36 μm. A kneading disk wag fitted in the twin-screw kneading extruder 18 during this time, and the screw rotation rate was set at 400 rpm. Thus, a modifier-containing thermoplastic resin composition containing 25 wt % titanium oxide pigment was prepared, and this was added to the base polymer of the withdrawal line 16 through the vented twin-screw kneading extruder 18 while maintaining its temperature at 285° C. The other conditions were the same as in Example 2.

The results of the evaluation are shown in Table 1.

EXAMPLE 4

In the process illustrated in FIG. 5, a 25 kg/hr volume of the base polymer was extracted out through the withdrawal line 16 and supplied to the vented twin-screw kneading extruder 18, while titanium oxide powder with a mean particle size of 0.34 μm was supplied at a volume of 25 kg/hr for kneading, and the resulting composition was added to the base polymer of the withdrawal line 16. The other conditions were the same as in Example 2.

The results of the evaluation are shown in Table 1.

EXAMPLE 5

Example 5 was carried out under the same conditions as in Example 2 except that a titanium oxide-containing master batch was added at 11 kg/hr.

The results of the evaluation are shown in Table 1.

EXAMPLE 6

Example 6 was carried out under the same conditions as in Example 3 except that the base polymer was extracted out at a volume of 12 kg/hr as a side stream and the titanium oxide powder was added to the vented twin-screw kneading extruder 18 at a volume of 3 kg/hr.

The results of the evaluation are shown in Table 1.

EXAMPLE 7

Example 7 was carried out under the same conditions as in Example 3 except that the base polymer was extracted out at a volume of 3 kg/hr and supplied to the vented twin-screw kneading extruder 18, the titanium oxide powder was supplied at a volume of 3 kg/hr for kneading, and the composition was added to the base polymer of the withdrawal line 16 through a nozzle.

The results of the evaluation are shown in Table 1.

EXAMPLE 8

The process illustrated in FIG. 4 was carried out under the same conditions as Example 2, except that the agitating direction of the dynamic mixing apparatus 11 was in the downward direction by rotation.

The results of the evaluation are shown in Table 1.

EXAMPLE 9

The process illustrated in FIG. 4 was carried out under the same conditions as Example 2, except that the rotation rate of the dynamic mixing apparatus 11 was 9 rpm and the residence time was set to 16 minutes.

The results of the evaluation are shown in Table 1.

EXAMPLE 10

In the process illustrated in FIG. 4, the base polymer was extracted out to the withdrawal line 16 at a volume of 675 kg/hr. Also, a titanium oxide-containing master batch was added to the withdrawal line 16 at a volume of 75 kg/hr, and then passed through the dynamic mixing apparatus 11. During this time, the rotation rate of the dynamic mixing apparatus 11 was 10 rpm and the residence time was set to 16 minutes, while the other conditions were the same as in Example 2.

The results of the evaluation are shown in Table 1.

EXAMPLE 11

The process illustrated in FIG. 4 was carried out under the same conditions as Example 2, except that the static mixing apparatus 10 used was a Model SMX static mixing element by Sulzer Co. (number of dividing elements: 18).

The results of the evaluation are shown in Table 1.

EXAMPLE 12

The process illustrated in FIG. 4 was carried out under the same conditions as Example 2, except that the mixing blade of the dynamic mixing apparatus 11 was replaced with the double motion paddle blade 4 shown in FIG. 2. The rotation rate of the mixing blade was 15 rpm, and the average residence time of the polymer in the dynamic mixing apparatus 11 was 10 minutes.

The results of the evaluation are shown in Table 1.

EXAMPLE 13

Figure 6:
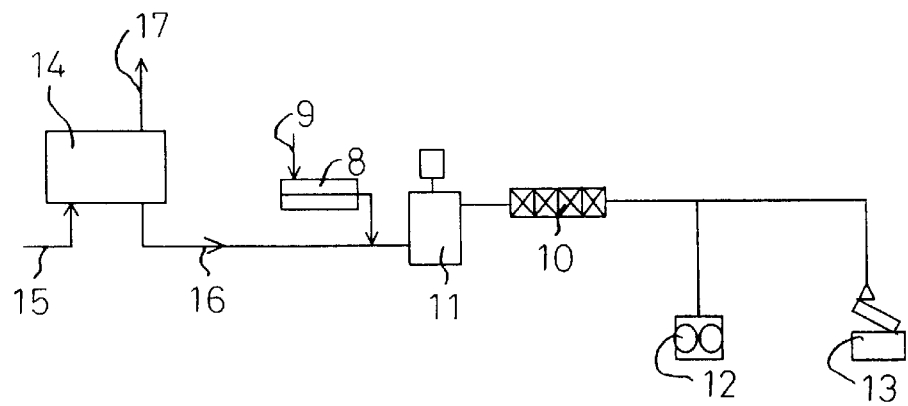

The process illustrated in FIG. 6 was carried out under the same conditions as Example 2, except that the master batch was added to the withdrawal line 16 of the base polymer and passed through the dynamic mixing apparatus 11 first before being passed through the static mixing apparatus 10.

The results of the evaluation are shown in Table 1.

EXAMPLE 14

Figure 7:
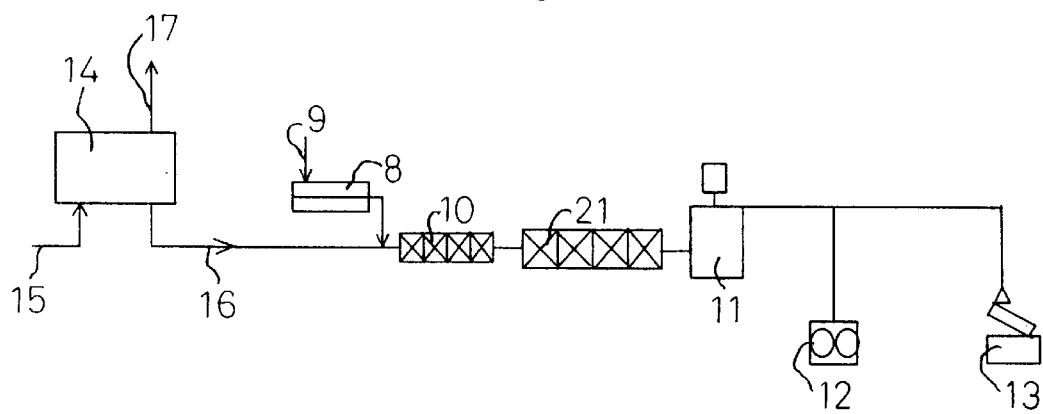

The process illustrated in FIG. 7 was carried out under the same conditions as Example 2, except that after adding the master batch to the withdrawal line 16 of the base polymer it was passed through a serially connected Sulzer static mixer 21 having 18 dividing elements and a Kenix static mixer 10 having 20 dividing elements, before being passed through the dynamic mixing apparatus 11.

The results of the evaluation are shown in Table 1.

EXAMPLE 15

Figure 8:
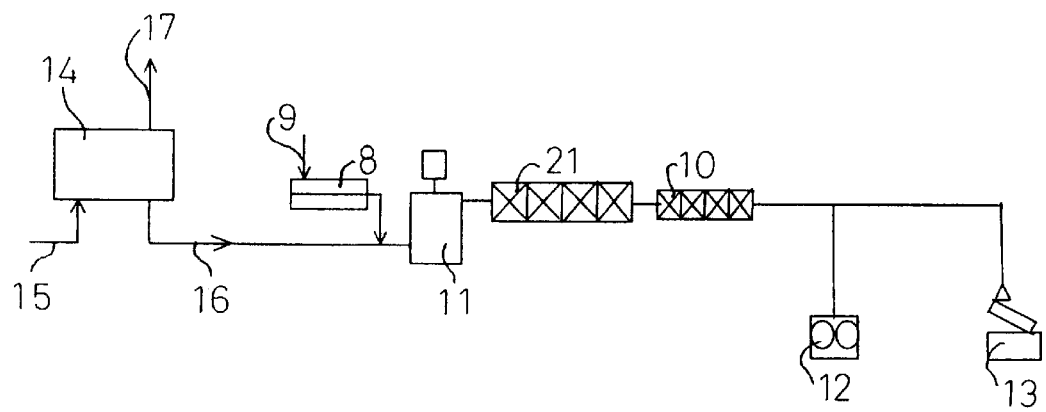

The process illustrated in FIG. 8 was carried out under the same conditions as Example 2, except that after adding the master batch to the withdrawal line 16 of the base polymer it was passed through the dynamic mixing apparatus 11 and then statically mixed in a serially connected Kenix static mixer 10 having 20 dividing elements and a Sulzer static mixer 21 having 18 dividing elements.

The results of the evaluation are shown in Table 1.

EXAMPLE 16

Figure 9:
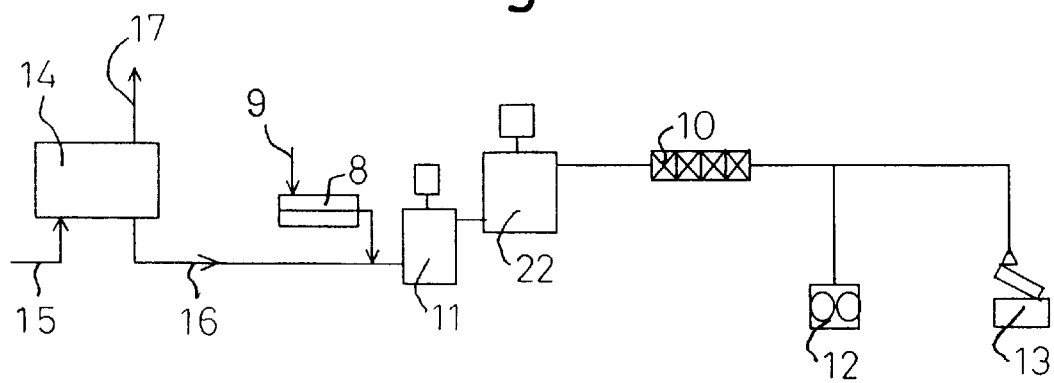

The process illustrated in FIG. 9 was carried out under the same conditions as Example 2, except that after adding the master batch to the withdrawal line 16 of the base polymer it was passed through dynamic mixing apparatuses 11 and 21 with respective average residence times of 9 and 12 minutes, after which it was passed through a Kenix static mixer 10 having 20 dividing elements.

The results of the evaluation are shown in Table 1.

EXAMPLE 17

Figure 10:
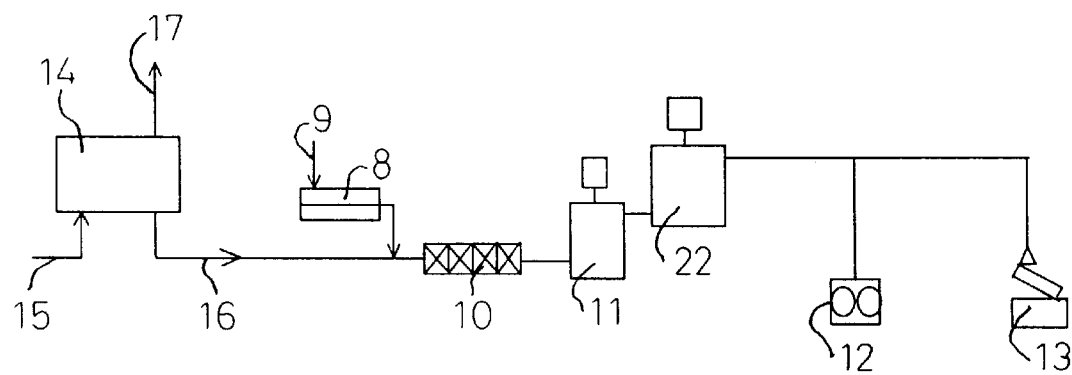

The process illustrated in FIG. 10 was carried out under the same conditions as Example 2, except that after adding the master batch to the withdrawal line 16 of the base polymer it was passed through a Kenix static mixer 10 having 20 dividing elements, and then through dynamic mixing apparatuses 11 and 22 which were serially connected and had respective average residence times of 9 and 12 minutes.

The results of the evaluation are shown in Table 1.

EXAMPLE 18

Figure 11:
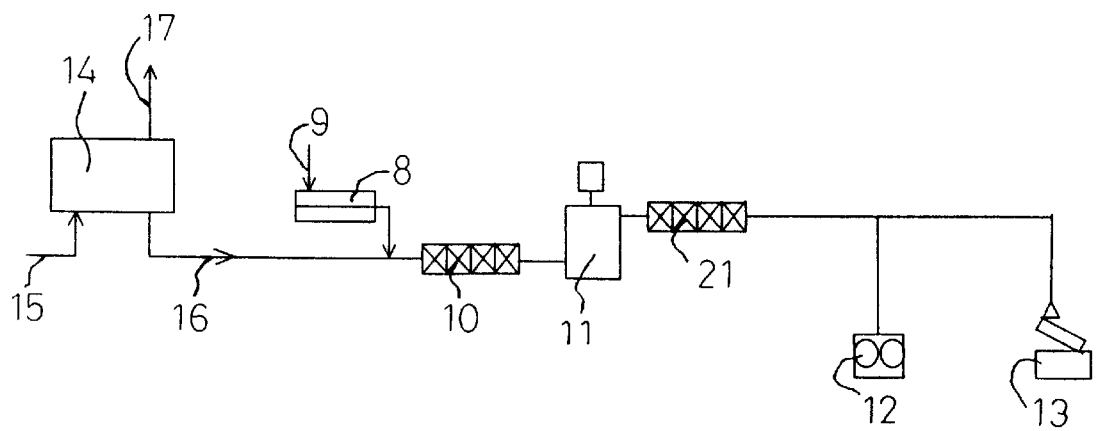

The process illustrated in FIG. 11 was carried out under the same conditions as Example 1, except that after adding the master batch to the withdrawal line 16 of the base polymer it was passed through serially connected mixing apparatuses including a Kenix static mixer 10 having 20 dividing elements, a dynamic mixing apparatus 11 and a Sulzer static mixer 21 with 18 dividing elements.

The results of the evaluation are shown in Table 1.

EXAMPLE 19

Figure 12:
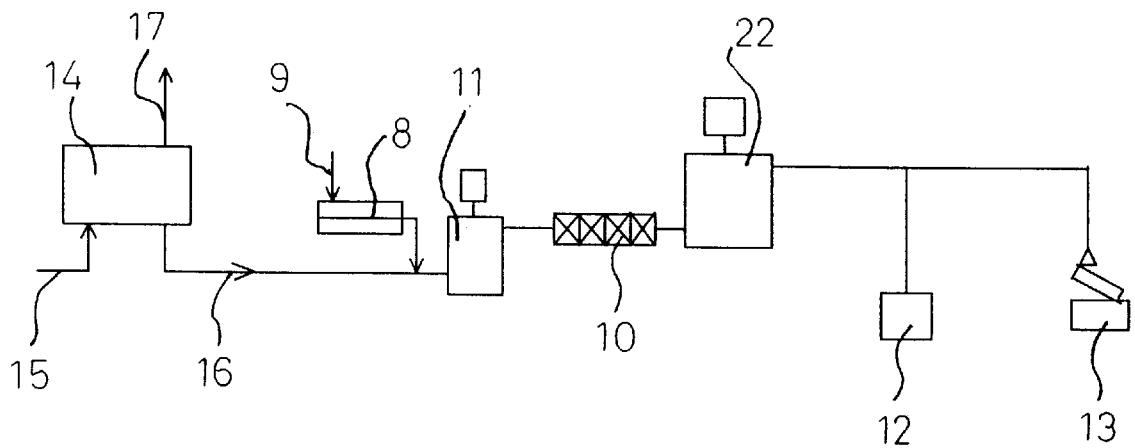

The process illustrated in FIG. 12 was carried out under the same conditions as Example 2, except that after adding the master batch to the withdrawal line 16 of the base polymer, a dynamic mixing apparatus 11 with a residence time of 9 minutes, a Kenix static mixer 10 having 20 dividing elements and a dynamic mixing apparatus 22 with a residence time of 12 minutes were serially connected and the modified polymer was passed through each apparatus.

The results of the evaluation are shown in Table 1.

EXAMPLE 20

Figure 13:
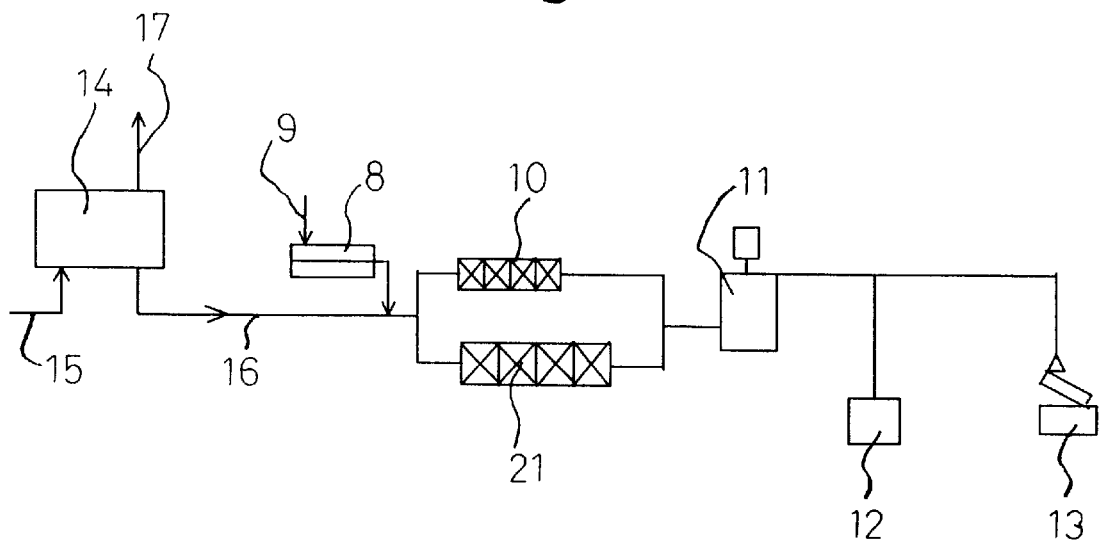

The process illustrated in FIG. 13 was carried out under the same conditions as Example 14, except that after passing the modified polymer through a Kenix static mixer 10 having 20 dividing elements arranged in parallel and a Sulzer static mixer 21 with 18 dividing elements, it was passed through the same type of complete mixing tank 11 as in Example 14 as the dynamic mixing apparatus.

The results of the evaluation are shown in Table 1.

EXAMPLE 21

In the process illustrated in FIG. 14, a vented twin-screw kneading extruder 25 was used as the dynamic mixing apparatus instead of the complete mixing tank 11 in Example 2. A backward feed segment was also mounted at two locations on the screws of the vented twin-screw kneading extruder 25 to provide a residence section. During this time the resin temperature in the twin-screw kneading extruder 25 was kept at 285° C., and the screw rotation rate was set at 400 rpm. The vent 26 of the twin-screw kneading extruder 25 was also connected to a pump (not shown) and kept at 1 Torr.

The results of the evaluation are shown in Table 1.

EXAMPLE 22

The process illustrated in FIG. 15 was carried out according to the conditions in Example 18 except that a vented twin-screw kneading extruder 25 was used as the dynamic mixing apparatus instead of the complete mixing tank 11. A backward feed segment was also mounted at two locations on the screws of the vented twin-screw kneading extruder 25 to provide a residence section. During this time the resin temperature in the twin-screw kneading extruder 25 was kept at 285° C., and the screw rotation rate was set at 400 rpm. The vent 26 of the twin-screw kneading extruder 25 was also connected to a pump (not shown) and kept at 1 Torr.

The results of the evaluation are shown in Table 1.

EXAMPLE 23

The process illustrated in FIG. 16 was carried out under the same conditions as in Example 22 except that a polyethylene terephthalate stream was introduced into the withdrawal line 16 of the base polymer at a volume of 750 kg/hr, and from kneading extruders 8 and 23 for addition of the modifier-containing thermoplastic resin provided at two locations there were added in succession titanium oxide containing 50 wt % titanium oxide at a volume of 50 kg/hr and a master batch copolymerized with 8 mole percent of 5-sodiumsulfoisophthalic acid, at a volume of 200 kg/hr.

The results of the evaluation are shown in Table 1. The abbreviation "IPS" used in Table 1 stands for "5-sodiumsulfoisophthalic acid".

EXAMPLE 24

First, terephthalic acid and ethylene glycol were used as the starting materials for complete esterification reaction in a batch reactor, after which polyethylene glycol with a molecular weight of 20,000 was added at 0.5% of the acid component and dodecylbenzenesulfonic acid was added at 0.5% of the acid component as electrostatic agents at the final stage of the polycondensation reaction, and polycondensation was continued to obtain a modifier-containing thermoplastic resin composition with an intrinsic viscosity of 0.60.

Also, in the process illustrated in FIG. 4, after complete esterification reaction using terephthalic acid and ethylene glycol as the starting materials in a continuous polymerization process, a base polymer consisting of a non-modifier-containing polyethylene terephthalate with an intrinsic viscosity of 0.65 which had undergone a prescribed polycondensation reaction was withdrawn into the withdrawal line 16 at a volume of 900 kg/hr, and the aforementioned modifier-containing thermoplastic resin composition was added to the withdrawal line 16 at a volume of 100 kg/hr. The base polymer temperature at this time was kept at 285° C. It was then subjected to distributed mixing through a static mixer 10 with 20 dividing elements manufactured by Noritake KK which was provided in the withdrawal line 16. It was subsequently passed through a dynamic mixing apparatus 11 equipped with a double motion paddle blade. The rotation rate of the mixing blade at this time was 15 rpm. The resulting modified polymer was supplied to a direct spinning step 12 at 500 kg/hr, and the remaining portion was supplied to a chipping step 13. Evaluation samples of the modified polymer were taken out from each step, and after chipping when necessary, the polyethylene glycol in the chips was dyed with osmic acid and observed with a transmission electron microscope, and the coarse matter and dispersability were evaluated in the same manner as the dispersion of the particles in the above-mentioned polyester.

The results of the evaluation are shown in Table 1. The abbreviations "PEG" and "DBS" used in Table 1 stand for "polyethylene glycol" and "dodecylbenzenesulfonic acid", respectively.

EXAMPLE 25

First, terephthalic acid and ethylene glycol were used as the starting materials for complete esterification reaction in a batch reactor, after which composite particles of trimethyl phosphate and calcium acetate were added at 5% in terms of phosphorus atoms as void forming agents at the initial stage of the polycondensation reaction, and polycondensation was continued to obtain a modifier-containing polyethylene terephthalate with an intrinsic viscosity of 0.60.

Next, in the process illustrated in FIG. 4, after complete esterification reaction using terephthalic acid and ethylene glycol as the starting materials in a continuous polymerization process, there was obtained a non-modifier-containing polyethylene terephthalate with an intrinsic viscosity of 0.65 which had undergone the prescribed polycondensation reaction. This was used as the base polymer and was supplied to the withdrawal line 16 at a volume of 900 kg/hr while the aforementioned modifier-containing polyethylene terephthalate was added to the withdrawal line 16 at a volume of 100 kg/hr. The base polymer temperature at this time was kept at 285° C. It was then passed through a static mixer 10 with 20 dividing elements manufactured by Noritake KK and further mixed in a dynamic mixing apparatus 11. The rotation rate of the dynamic mixing apparatus 11 at this time was 15 rpm, and the residence time was set to 12 minutes. The resulting modified polymer was supplied to a direct spinning step 12 at 500 kg/hr, and the remaining portion was supplied to a chipping step 13. Evaluation samples obtained from the direct spinning step 12 were chipped, the chips were subjected to reflux treatment for one hour in a 20% aqueous sodium hydroxide solution, and the voids formed on the surface of the fibers obtained by the spinning step were evaluated in the same manner as the particle coarse matter and dispersion in the above-mentioned polyester.

The results of the evaluation are shown in Table 1. The abbreviation "TMP-Ca" used in Table 1 stands for "trimethylphosphate and calcium acetate composite particles".

EXAMPLE 26

First, terephthalic acid, isophthalic acid at 15 mole percent to the terephthalic acid and ethylene glycol were used as the starting materials for complete esterification reaction in a batch reactor, and polycondensation reaction was conducted to obtain an isophthalic acid-containing thermoplastic resin with an intrinsic viscosity of 0.65.

Next, in the process illustrated in FIG. 9, after complete esterification reaction using terephthalic acid and ethylene glycol as the starting materials in a continuous polymerization process, a base polymer of a non-modifier-containing polyethylene terephthalate with an intrinsic viscosity of 0.65 was obtained which had undergone the prescribed polycondensation reaction. This polymer was supplied to the withdrawal line 16 at a volume of 250 kg/hr. The base polymer temperature at this time was kept at 285° C. It was passed through a kneading extruder 8 and the aforementioned resin was added to the base polymer at a volume of 250 kg/hr to obtain a modified polymer. This was then passed through dynamic mixing apparatuses 11 and 22, and then through a static mixer 10 with 20 dividing elements manufactured by Noritake KK for distributed mixing. The modified polymer obtained in this manner was supplied to a direct spinning step 12 at a volume of 250 kg/hr, and the remaining portion was supplied to a chipping step 13. The dispersability was evaluated by taking random 0.1 g samples of simultaneously spun fibers, measuring the melting points and noting any variations.

The results of the evaluation are shown in Table 1. The abbreviation "IA" used in Table 1 stands for "isophthalic acid".

EXAMPLE 27

The process illustrated in FIG. 4 was carried out under the same conditions as in Example 2 except that a polyester containing 5 wt % silica particles with a mean particle size of 1 μm was used as the master batch and adjusted so that the silica concentration in the final product was 500 ppm, and was added to the withdrawal line 16 of the base polymer.

The results of the evaluation are shown in Table 1.

EXAMPLE 28

In the process illustrated in FIG. 4, nylon 6 which had completed polymerization reaction was used as the base polymer and supplied to the withdrawal line 16 at a volume of 900 kg/hr. The base polymer temperature at this time was kept at 265° C. Separately, the base chips consisting of nylon 6 and titanium oxide were supplied to a twin-screw kneading extruder 8, and a master batch composed of nylon 6 and containing 25 wt % titanium oxide was prepared and added into the withdrawal line 16 through the twin-screw kneading extruder 8 at a volume of 100 kg/hr. It was then distributed and mixed through a Kenix static mixer 10 with 20 dividing elements, and directed to a complete mixing tank 11 equipped with a double helical ribbon blade as shown in FIG. 1. Agitation was in the upward direction, and the rotation rate was 15 rpm. The residence time of the polymer in the complete mixing tank was 12 minutes. The modified polymer obtained in this manner was supplied to a direct spinning step 12 at 500 kg/hr, and the remaining portion was supplied to a chipping step 13.

The results of the evaluation are shown in Table 1.

EXAMPLE 29

In the process illustrated in FIG. 3, the polypropylene chips were melted and supplied to the withdrawal line 7 of the base polymer at a volume of 90 kg/hr, and then a master batch consisting of polypropylene containing 5 wt % talc was supplied from the kneading extruder 8 to the withdrawal line 7 at a volume of 10 kg/hr. The base polymer temperature at this time was kept at 230° C. The resulting modified polymer was supplied to a direct spinning step 12 and a chipping step 13 at 50 kg/hr each.

The results of the evaluation are shown in Table 1.

EXAMPLE 30

In the process illustrated in FIG. 17, 14 is the final reactor for continuous polymerization, 15 is the entrance port for the polymerization reactor, and 16 is the withdrawal line for the completely polymerized polymer. Also, 17 is a vacuum system. Here, the withdrawal line 16 is further divided into 4 parallel lines indicated by 27, 29, 31 and 37. The modifier-containing thermoplastic resin loaded from the loading ports 9, 24 and 33 are each supplied to the three withdrawal lines 27, 29 and 31 by extruders 8, 23 and 32. In addition, the modifier-containing thermoplastic resin is also supplied from two kneading extruders 38 and 40 to the other withdrawal line 37 through the loading ports 39 and 41, respectively.

Static mixers 10, 21, 34 and 42 are each provided in the withdrawal lines 27, 29, 31 and 37. Also, complete mixing tanks 11, 22, 35 and 43 are provided, one for each static mixer 10, 21, 34 and 42, and all in a series. The static mixers 10, 34 and 42 were Kenix static mixers with 20 dividing elements, while the static mixer 21 was a Sulzer static mixer with 18 dividing elements.

Upward agitating double helical ribbon blades were used for the complete mixing tanks 11, 35 and 43, and a double motion paddle blade was used for the complete mixing tank 22. During the mixing all of the mixing blade rotation rates were kept at 12 rpm, and the residence times were all set for 12 minutes.

In this process, terephthalic acid and ethylene glycol were used as the starting materials, and the non-modifier-containing polyethylene terephthalate with an intrinsic viscosity of 0.65 from esterification reaction and polycondensation reaction was supplied as the base polymer to the 4 withdrawal lines 27, 29, 31 and 37 each at a volume of 150 kg/hr. The base polymer temperature at this time was kept at 285° C. Separately, the base chips and titanium oxide were supplied to a twin-screw kneading extruder to prepare a master batch of polyethylene terephthalate containing 50% titanium oxide with a mean particle size of 0.35 μm (intrinsic viscosity: 0.49). In a separate batch system reactor there was also prepared a master batch copolymerized with 8 mole percent of 5-sodiumsulfoisophthalic acid.

A straight polymer was obtained without adding the master batch in the withdrawal line 27. The titanium oxide-containing master batch was added in the withdrawal line 29 at a volume of 0.91 kg/hr. The titanium oxide-containing master batch was also added in the withdrawal line 31 at a volume of 7.9 kg/hr. In the withdrawal line 37 there were added the titanium oxide-containing master batch at a volume of 7.1 kg/hr and the 5-sodiumsulfoisophthalic acid-containing master batch at a volume of 21.4 kg/hr from the extruders 38 and 40, respectively.

A straight polymer was obtained directly without adding the master batch at the first line 27 of the 4 withdrawal lines 27, 29, 31 and 37. The titanium oxide-containing master batch was added to the second line 29 at a volume of 0.91 kg/hr. The titanium oxide-containing master batch was added in succession to the third line 31 through a provided adding nozzle, at a volume of 7.9 kg/hr. To the fourth line 37 there were added the titanium oxide-containing master batch at a volume of 7.1 kg/hr and the 5-sodiumsulfoisophthalic acid master batch at a volume of 21.4 kg/hr.

The modified thermoplastic resin compositions finally obtained from each of the lines 27, 29, 31 and 37 were supplied to a direct spinning step 12 or chipping steps 28, 30, 36 and 45. The coarse particles in the chips, dispersability, changes in degree of mixing with time and the filtration pressure increase rate during spinning were determined after the chipping.

The results of the evaluation are shown in Table 1. The abbreviation "IPS" used in Table 1 stands for "5-sodiumsulfoisophthalic acid".

Comparative Example 1

Figure 18:
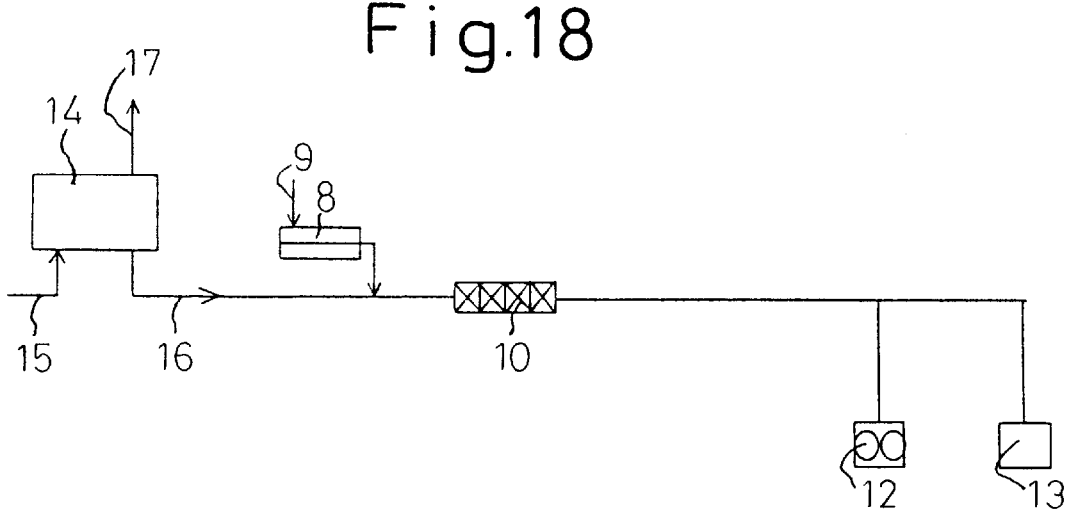
FIGS. 18 to 20 are simplified process diagrams illustrating conventional processes for preparing modified thermoplastic resins.

The process illustrated in FIG. 18, which was the process illustrated in FIG. 4 without the dynamic mixing apparatus, was carried out under the same conditions as in Example 2 except that the mixing was accomplished with only the static mixing apparatus 10.

The results of the evaluation are shown in Table 1.

Comparative Example 2

Figure 19:
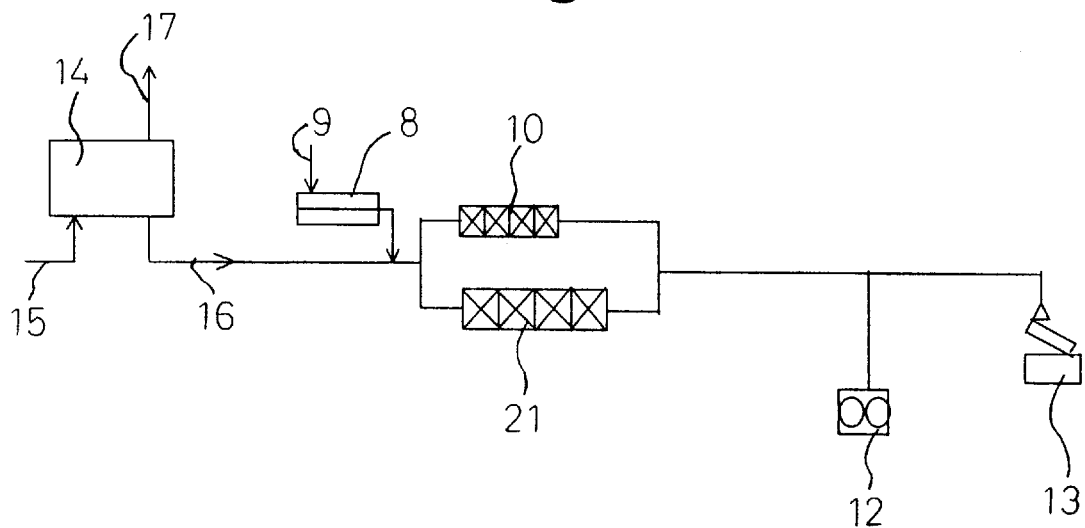

The process illustrated in FIG. 19, which was the process illustrated in FIG. 13 without the dynamic mixing apparatus 11, was carried out under the same conditions as in Example 20 except that the mixing was accomplished with only the static mixing apparatuses 10 and 21 arranged in parallel.

The results of the evaluation are shown in Table 1.

Comparative Example 3

The process illustrated in FIG. 18, which was the process illustrated in FIG. 4 without the dynamic mixing apparatus 11, was carried out under the same conditions as in Example 25 except that the mixing was accomplished with only the static mixing apparatus 10.

The results of the evaluation are shown in Table 1. The abbreviation "TMP-Ca" used in Table 1 stands for "trimethylphosphate and calcium acetate composite particles".

Comparative Example 4

Figure 20:
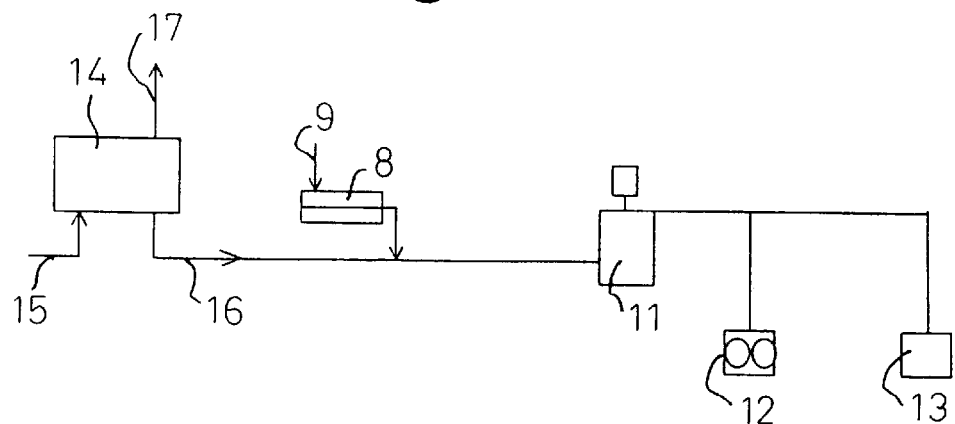

The process illustrated in FIG. 20, which was the process illustrated in FIG. 4 without the static mixing apparatus 11, was otherwise carried out under the same conditions as in Example 1.

The results of the evaluation are shown in Table 1.

As explained above, these Comparative examples 1–4 were all inferior to Examples 1–30 in terms of the properties evaluated, i.e. dispersion of the modifier, change in the degree of mixing with time and filtration pressure increase rate.

TABLE 1

| Example | Modifier | Modifier content in product (wt %) | Dispersing property | Change in degree of mixing with time | Filtration pressure increase rate | Reference illustration |
|---|---|---|---|---|---|---|
| Example 1 | titanium oxide | 2.5 | special grade | first grade | special grade | FIG. 3 |
| Example 2 | titanium oxide | 2.5 | special grade | special grade | special grade | FIG. 4 |
| Example 3 | titanium oxide | 2.5 | special grade | special grade | special grade | FIG. 5 |
| Example 4 | titanium oxide | 2.5 | special grade | special grade | special grade | FIG. 5 |
| Example 5 | titanium oxide | 0.3 | special grade | first grade | special grade | FIG. 4 |
| Example 6 | titanium oxide | 0.3 | special grade | first grade | special grade | FIG. 5 |
| Example 7 | titanium oxide | 0.3 | special grade | first grade | special grade | FIG. 5 |
| Example 8 | titanium oxide | 2.5 | first grade | first grade | special grade | FIG. 4 |
| Example 9 | titanium oxide | 2.5 | first grade | first grade | first grade | FIG. 4 |
| Example 10 | titanium oxide | 2.5 | special grade | special grade | first grade | FIG. 4 |
| Example 11 | titanium oxide | 2.5 | special grade | special grade | special grade | FIG. 4 |
| Example 12 | titanium oxide | 2.5 | special grade | special grade | special grade | FIG. 4 |
| Example 13 | titanium oxide | 2.5 | special grade | special grade | special grade | FIG. 6 |
| Example 14 | titanium oxide | 2.5 | special grade | special grade | special grade | FIG. 7 |
| Example 15 | titanium oxide | 2.5 | special grade | special grade | special grade | FIG. 8 |
| Example 16 | titanium oxide | 2.5 | special grade | special grade | special grade | FIG. 9 |
| Example 17 | titanium oxide | 2.5 | special grade | special grade | special grade | FIG. 10 |
| Example 18 | titanium oxide | 2.5 | special grade | special grade | special grade | FIG. 11 |
| Example 19 | titanium oxide | 2.5 | special grade | special grade | special grade | FIG. 12 |
| Example 20 | titanium oxide | 2.5 | special grade | first grade | special grade | FIG. 13 |
| Example 21 | titanium oxide | 2.5 | special grade | special grade | special grade | FIG. 14 |
| Example 22 | titanium oxide | 2.5 | special grade | special grade | special grade | FIG. 15 |
| Example 23 | titanium oxide/ IPS | 2.5 wt %/ 1.6 mole % | special grade | special grade | special grade | FIG. 16 |
| Example 24 | PEG/DBS | 0.5/0.5 | special grade | special grade | first grade | FIG. 4 |
| Example 25 | TMP-Ca | 0.5 | special grade | special grade | special grade | FIG. 4 |
| Example 26 | IA | 7.5 mole % | special grade | special grade | special grade | FIG. 9 |
| Example 27 | silica | 0.05 | special grade | special grade | special grade | FIG. 4 |
| Example 28 | talc | 0.5 | special grade | special grade | special grade | FIG. 4 |
| Example 29 | titanium oxide | 2.5 | special grade | special grade | special grade | FIG. 3 |
| Example 30 | titanium oxide | 0.3 | special grade | special grade | special grade | FIG. 17 |
|  | titanium oxide | 2.5 | special grade | special grade | special grade |  |
|  | titanium oxide/ IPS | 2.5 wt %/ 1.0 mole % | special grade | special grade | special grade |  |
| Comp. Ex. 1 | titanium oxide | 2.5 | third grade | third grade | third grade | FIG. 18 |
| Comp. Ex. 2 | titanium oxide | 2.5 | second grade | third grade | first grade | FIG. 19 |
| Comp. Ex. 3 | TMP-Ca | 0.5 | second grade | third grade | third grade | FIG. 18 |
| Comp. Ex. 4 | titanium oxide | 0.5 | second grade | third grade | third grade | FIG. 20 |

Industrial Applicability

According to the present invention there is provided a process for continuous production of thermoplastic resins by addition of a modifier-containing thermoplastic resin to the withdrawal line of a base polymer obtained by continuous polymerization of a thermoplastic resin, followed by passage through a static mixing apparatus and a dynamic mixing apparatus equipped with a mixing blade. Resin compositions obtained in this manner exhibit a very notable effect in excellent molding workability when molded and worked into fibers, films and resin molds, as well as excellent product quality for fibers, films and resin molds. According to the invention it is possible to easily accomplish such steps and achieve such quality in the withdrawal line of continuous polymerization, and thus a radical advance can be made in multiproduct manufacture of thermoplastic resins, while obtaining thermoplastic resin compositions with modifiers highly dispersed therein.

What is claimed is:

1. A process for preparing a modified thermoplastic resin comprising the steps of:
   (a) supplying a continuously polymerized thermoplastic resin into a transport line in a molten state,
   (b) incorporating a modifier-containing thermoplastic resin into the transport line in a molten state, wherein the modifier-containing thermoplastic resin contains at least one type of modifier,
   (c) mixing said continuously polymerized thermoplastic resin and said modifier-containing thermoplastic resin in the transport line by subjecting the incorporated resin to both at least one forceful dynamic mixing by external power and at least one static mixing involving no external power, and
   (d) obtaining a modified thermoplastic resin by said mixing.

2. A process according to claim 1, wherein the dynamic mixing is carried out in a complete mixing tank, and the mixing system is one employing a mixing blade selected from the group consisting of double helical ribbon blades, anchor blades, double motion paddle blades, helical screw blades, MIG blades and helicon blades.

3. A process according to claim 2, wherein the total mixing number N of the dynamic mixing apparatus is 100 or greater where the total mixing number N is defined by the equation: total mixing number N (times)=rotation rate of the mixing blade (rpm)×residence time in the dynamic mixing apparatus (min).

4. A process according to claim 1, wherein said dynamic mixing is carried out with a kneading extruder.

5. A process according to claim 4, wherein backward feed means is provided which allows backward feed of a portion of the modified thermoplastic resin transported in said kneading extruder against the direction of transport.

6. A process according to claim 1, wherein said static mixing and/or dynamic mixing is carried out alternately, wherein (A) at least two different types of dynamic mixing are carried out with different resin residence times and/or mixing systems, and/or (B) at least two different types of static mixing are carried out with different numbers of divisions and/or division modes for the incorporated resin in the plane perpendicular to the direction of resin flow.

7. A process according to claim 1, wherein said transport line is a withdrawal line for a thermoplastic resin in a continuous polymerization reaction apparatus.

8. A process according to claim 7, wherein said resin withdrawal line is split into two lines, and the modifier-containing thermoplastic resin is added to at least one of said split lines while static mixing and dynamic mixing are carried out downstream from the addition point of resin.

9. A process according to claim 1, wherein two or more types of modifier-containing thermoplastic resins are added and mixed in said transport line.

10. A process according to claim 1, wherein the modifier content of said modified thermoplastic resin is 0.001–50 wt % with respect to the total weight of said modified thermoplastic resin.

11. A process according to claim 1, wherein the modifier content of said modifier-containing thermoplastic resin is 0.1–70 wt % based on the total weight of said modifier-containing thermoplastic resin.

12. A process according to claim 1, wherein the modifier in said modifier-containing thermoplastic resin consists of inactive particles with a mean particle size in the range of 0.1–5 μm.

13. A process according to claim 12, wherein said inactive particles are anatase-type titanium oxide.

14. A process according to claim 1, wherein the thermoplastic resin flowing in said transport line is a polyester.

15. A process according to claim 14, wherein the modifier-containing polyester added to the transport line of the thermoplastic resin contains at least one type of modifier selected from the group consisting of alkylsulfonates, alkylbenzenesulfonates and trimethylphosphate calcium salts with an average carbon number of 20 or less and polyethylene glycol with an average molecular weight of 4000 or greater, and static mixing and dynamic mixing are carried out in the same transport line.

16. A process according to claim 15, wherein the modifier content of said modifier-containing polyester is 0.5–30 wt % based on the total weight of the modifier-containing polyester.

17. A process according to any of claims 14 to 16, wherein a polyester at least a portion of the modifier of which is copolymerized is added to the molten polyester resin flowing in said transport line, to continuously produce a thermoplastic resin composition wherein substantially all of the modifier is copolymerized.

18. A process according to claim 17, wherein said copolymerizable modifier is of one or more types of substances selected from the group consisting of 5-sodiumsulfoisophthalic acid and quaternary phosphonium substituted salts thereof, isophthalic acid and its ester-forming derivatives, adipic acid, sebacic acid and their ester-forming derivatives, diethylene glycol, triethylene glycol, polyethylene glycols of molecular weight 4000 or less, and bisphenol compound-diethylene glycol addition products and their ester-forming derivatives.

19. A process according to claim 17, wherein the modifier content of said copolymerizable modifier-containing polyester is 5–50 mole percent.

20. A modified thermoplastic resin composition obtained by incorporating at least one type of modifier-containing thermoplastic resin into the transport lines in a molten state for a continuously polymerized thermoplastic resin and subjecting the continuously polymerized thermoplastic resin and said modifier-containing thermoplastic resin to static mixing in said transport line and dynamic mixing for forceful kneading by external power, wherein the filtration pressure of the composition rate is no greater than the 10 kg/cm$^3$/hr when filtration is performed using a double layer of 2400 mesh wire filters with an inner diameter of 64 mm, at a melting point of the modified thermoplastic resin or a temperature of from 20° C. to 100° C. higher than the plasticizing point of the resin and at filtration rate of 33.3 g/min.

21. A modified thermoplastic resin composition according to claim 20, wherein the thermoplastic resin flowing through said transport line is a polyester.

22. A modified thermoplastic resin composition according to claim 21, which is a modified polyester composition obtained by adding a polyester containing anatase-type titanium oxide with a mean particle size of 0.01–5 μm as the modifier, wherein the content of said titanium oxide is 0.1–10 wt % based on the total weight of the polyester composition.

23. A modified thermoplastic resin composition according to claim 21, which is a polyester composition obtained by adding a polyester containing at least one type of modifier selected from the group consisting of alkylsulfonates, alkylbenzenesulfonates and trimethylphosphate calcium salts with an average carbon number of 20 or less and polyethylene glycol with an average molecular weight of 4000 or greater, wherein the content of said titanium oxide is 0.1–10 wt % based on the total weight of the polyester composition.

24. A modified thermoplastic resin composition according to claim 21, wherein said thermoplastic resin is a polyester, and a polyester, at least a portion of the modifier of which is copolymerized, is added to give a composition wherein substantially all of the modifier is copolymerized with the polyester composition.

25. A modified thermoplastic resin composition according to claim 24, wherein the thermoplastic resin is a polyester and a polyester copolymerized with a modifier of one or more types of substances selected from the group consisting of isophthalic acid, 5-sodiumsulfoisophthalic acid and quaternary phosphonium substituted salts thereof, adipic acid, sebacic acid and their ester-forming derivatives, diethylene glycol, triethylene glycol and polyethylene glycols of molecular weight 4000 or less, is added to give a composition wherein substantially all of the modifier is copolymerized with the polyester composition.

* * * * *